United States Patent
Hairston et al.

(10) Patent No.: US 9,188,269 B2
(45) Date of Patent: Nov. 17, 2015

(54) CURED IN PLACE LINER SYSTEM AND INSTALLATION METHODS

(75) Inventors: Mark Hairston, Imperial, MO (US); Barry Paschall, Hillsboro, MO (US); Keith B. Oxner, Chesterfield, MO (US); Kyle Costa, Wentzville, MO (US)

(73) Assignee: INA Acquisition Corp., Wilmington, DE (US)

( * ) Notice: Subject to any disclaimer, the term of this patent is extended or adjusted under 35 U.S.C. 154(b) by 1156 days.

(21) Appl. No.: 13/185,143

(22) Filed: Jul. 18, 2011

(65) Prior Publication Data
US 2012/0012217 A1 Jan. 19, 2012

Related U.S. Application Data

(60) Provisional application No. 61/365,177, filed on Jul. 16, 2010.

(51) Int. Cl.
| | |
|---|---|
| *F16L 55/16* | (2006.01) |
| *F16L 55/165* | (2006.01) |
| *B29C 57/00* | (2006.01) |
| *B29C 63/34* | (2006.01) |

(52) U.S. Cl.
CPC ........... *F16L 55/1651* (2013.01); *B29C 57/005* (2013.01); *B29C 63/34* (2013.01); *B29C 63/346* (2013.01); *F16L 55/165* (2013.01)

(58) Field of Classification Search
CPC .................................................. B29C 63/346
See application file for complete search history.

(56) References Cited

U.S. PATENT DOCUMENTS

| | | | |
|---|---|---|---|
| 3,578,360 A | 5/1971 | Eliot | |
| 3,828,823 A * | 8/1974 | Douglas | 138/109 |
| 3,968,552 A | 7/1976 | Hunter | |
| 4,277,091 A | 7/1981 | Hunter | |
| 4,357,745 A | 11/1982 | Chlebowski | |

(Continued)

OTHER PUBLICATIONS

Norditube Technologies AB. "NordiPipe Installation Manual." Jun. 2006, version 3.1, 49 pgs.

(Continued)

*Primary Examiner* — Benjamin Schiffman
(74) *Attorney, Agent, or Firm* — Senniger Powers LLP

(57) ABSTRACT

A cured in place liner system and associated connections and methods are disclosed. The cured in place pipe system forms a completely rehabilitated, stand-alone, fluid-tight flow path between upstream and downstream portions of an existing pipe system. The rehabilitated flow path is stand-alone in that the liner system does not rely on structure of the portion of the pipe system through which the liner system is installed to define the fluid-tight flow path. The flow path between upstream and downstream portions of the liner system is defined by and made fluid-tight solely by components of the rehabilitation system such as cured in place liners and couplers. The portion of the pipe system through which the rehabilitation system is installed merely provides a path (e.g., through the ground) through which the cured in place liner system can be inserted. After the cured in place liner system is installed, the liner system forms a fluid-tight flow path between an upstream portion of the pipe system and a downstream portion of the pipe system. Various types of connections may be used. In addition, various types of methods may be used in forming the connections, such as using a mold to cure connecting sections of the cured in place liners in desired configurations (e.g., having a generally circular outer profile) for forming connections with the liners.

19 Claims, 28 Drawing Sheets

(56) References Cited

U.S. PATENT DOCUMENTS

| | | |
|---|---|---|
| 4,691,740 A | 9/1987 | Svetlik et al. |
| 4,887,848 A | 12/1989 | Burba |
| 5,199,153 A * | 4/1993 | Schulte-Ladbeck ............ 29/447 |
| 5,282,654 A | 2/1994 | Hendrickson |
| 5,364,130 A | 11/1994 | Thalmann |
| 5,780,123 A | 7/1998 | Kamiyama et al. |
| 5,941,576 A | 8/1999 | Krausz |
| 6,036,235 A | 3/2000 | Anderson et al. |
| 6,086,111 A | 7/2000 | Harper |
| 6,293,556 B1 | 9/2001 | Krausz |
| 7,025,384 B2 | 4/2006 | Whitehead et al. |
| 7,344,161 B2 | 3/2008 | Howard et al. |
| 7,722,085 B2 | 5/2010 | Pionetti |
| 2006/0145479 A1 | 7/2006 | McIntyre |

OTHER PUBLICATIONS

Depend-O-Lok, Inc—Victaulic Mechanical EndSeal Drawing, dated Feb. 23, 2005. 1 pg.

* cited by examiner

CURED IN PLACE LINER SYSTEM AND INSTALLATION METHODS

FIELD OF THE INVENTION

The present disclosure generally relates to pipe rehabilitation. In particular, the present disclosure relates to pipe rehabilitation using a cured in place liner system.

BACKGROUND

This invention relates to a cured in place liner system and methods for internally lining an existing pipe with a cured in place liner system. A variety of circumstances exist in which it is desirable to line a pipeline. For instance, in the municipal area, it may be necessary to line a water distribution pipes to form a rehabilitated flow path. A similar need exists in other industries, such as in the chemical pipeline industries. Conventional pipe lining operations require use of components of the existing pipe system to form the rehabilitated flow path. For example, the liner may depend on a seal with the existing pipe to form a rehabilitated fluid-tight flow path. It is desirable to provide improved systems and methods to rehabilitate a pipeline.

SUMMARY

In one aspect, the present invention includes a method for installing a liner impregnated with a curable resin in a previously installed host pipe. The method includes positioning a mold which is separate from the pipe at an end of the pipe. The liner is positioned in the pipe so a connecting section of the liner extends into the mold. The liner is cured whereby the mold causes the connecting section to cure in a predetermined desired configuration for forming a connection with the liner. The mold is removed from the liner.

In another aspect, the present invention includes a rehabilitated pipe system including an existing pipe system. The rehabilitated pipe system includes a cured in place pipe system comprising separately formed lengths of resin cured liner installed in the existing pipe system. The separately formed lengths of resin cured liner are adjacent to each other and sealed to each other so that the cured in place pipe system is stand alone having no fluid communication with the existing pipe system.

In another aspect, the present invention includes a method of installing a pipe rehabilitation system in a portion of a previously installed host pipe system. The method includes installing a first length of cured in place liner into the previously installed host pipe system and installing a second length of cured in place liner into the previously installed host pipe system. The first and second lengths of cured in place liner are in generally end to end relation. The method also includes forming a fluid tight connection joint between the first and second lengths of installed lengths of cured in place liner that is independent of the previously installed host pipe system.

Other objects and features of the present invention will be in part apparent and in part pointed out hereinafter.

BRIEF DESCRIPTION OF THE DRAWINGS

Corresponding reference characters indicate corresponding parts throughout the drawings.

DETAILED DESCRIPTION

In the municipal area, many water mains were constructed years ago and the wall structures are now badly eroded or collapsing. Damaged water pipes present a serious problem because they may lead to contamination of drinking water. In order to repair these water mains or other such conduits, it has been proposed to install a liner within the water mains to provide a new water-impervious wall to the system. There are a wide variety of different methods available in the art for inserting liners within existing conduits. These lining methods may include eversion or pull-in of a resin impregnated liner and curing the liner after it is positioned within the pipeline.

It is desirable to provide a cured in place pipe rehabilitation system extending through a portion of an existing pipe system to form a completely rehabilitated, stand-alone, fluid-tight flow path between upstream and downstream portions of the existing pipe system. The rehabilitated flow path is stand-alone in that the rehabilitation system does not rely on structure of the portion of the pipe system through which the rehabilitation system is installed to define the fluid-tight flow path. The flow path between the portions of the pipe system upstream and downstream of the rehabilitation system is defined by and made fluid-tight solely by components of the rehabilitation system such as cured in place liners and couplers, as described in further detail below. The portion of the pipe system through which the rehabilitation system is installed merely provides a path (e.g., through the ground) through which the cured in placer liner system can be inserted. After the cured in place liner system is installed, the liner system forms a fluid-tight flow path between an upstream portion of the pipe system and a downstream portion of the pipe system. It will be apparent to those of ordinary skill in the art that the rehabilitation system may occupy all or only a part of a pipe system. Other parts of the pipe system may even be lined, but with liners that rely on existing pipe to form joints.

Figure 1:
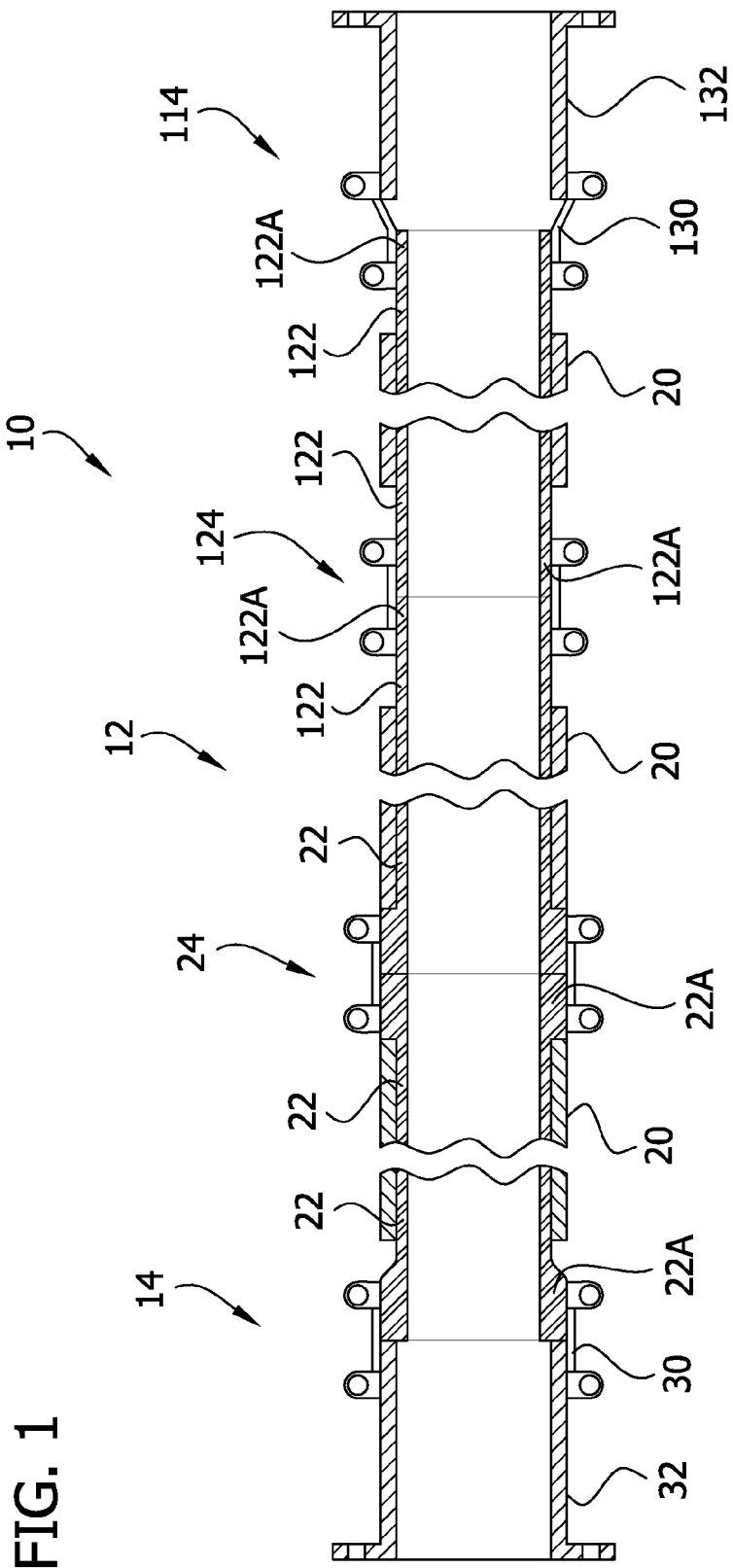
FIG. 1 is a fragmentary section of a rehabilitated pipe system including a cured in place liner system.

Referring now to the drawings and in particular to FIG. 1, a rehabilitated pipe system is designated generally at 10. A pipe rehabilitation system generally comprises a cured in place liner system, generally designated 12, and connecting joints, generally designated at 14, 24, 114, 124. The cured in place liner system 12 is installed in a portion of an existing pipe system, usually comprising multiple lengths of pipe 20. The cured in place liner system 12 is installed along and within the lengths of host pipe 20 making up the portion of the pipe system to be rehabilitated. The cured in place liner system 12 comprises at least one cured in place liner 22, 122. The liner system 12 may comprise an assembly of several cured in place liners 22, 122, depending upon the length of the portion of the pipe system to be rehabilitated. Only two lines are shown, but any number of liners may be used to form a cured in place liner system. The cured in place liners 22, 122 are generally flexible and comprise at least a layer of resin impregnable material (e.g., polyester felt) and a layer of impermeable material (e.g., a plastic film). Various constructions of cured in place liners 22, 122 are known in the art, and such constructions may be used without departing from the scope of the present invention. The liners 22, 122 may be inserted by, for example, eversion or pull-in into the existing host pipes 20 or other methods known in the art. Various configurations and methods for coupling the liners 22, 122 in fluid communication will be discussed in more detail below.

The connecting joints 14, 114 connect the cured in place liner system 12 in fluid communication with the existing pipe system upstream and downstream of the portion of the pipe system to be rehabilitated. Connecting joints such as joints 14, 114 which connect upstream and downstream ends of the cured in place liner system 12 with the existing pipe system may be referred to as terminal joints. Intermediate connecting joints 24, 124 are used to connect adjacent cured in place liners 22, 122 in fluid communication with each other. The connecting joints 14, 24, 114, 124 each form a fluid-tight connection. The connecting joints 14, 114 of FIG. 1 include a coupler 30, 130 and a coupling section 22A, 122A of a respective liner 22, 122, and may include a pipe segment 32, 132 for facilitating connection to the existing pipeline. For example, as illustrated in FIG. 1, the pipe segments 32, 132 may be flanged to correspond to a flanged termination (not shown) of the existing pipeline to facilitate connection to the existing pipeline (e.g., by securing the flanges via bolts). Alternatively, the connecting joint 14, 114 may comprise a coupler similar to those indicated 30 or 130 that connect the cured in place liner system 12 directly to the existing pipe system without the use of a pipe segment 32, 132 (not shown in FIG. 1). Other types of connecting joints are within the scope of the present invention. Various types of connecting joints will be described in more detail below. Example couplers that may be used are described in U.S. Pat. Nos. 5,941,576 and 6,293,556, which are herein incorporated by reference in their entireties. Couplers which may be used include those sold by Total Piping Solutions, Inc. of Olean, N.Y. under the trade name HYMAX and those sold by EBAA Iron, Inc. of Eastland, Tex. under the trade name MEGALUG.

Figure 2:
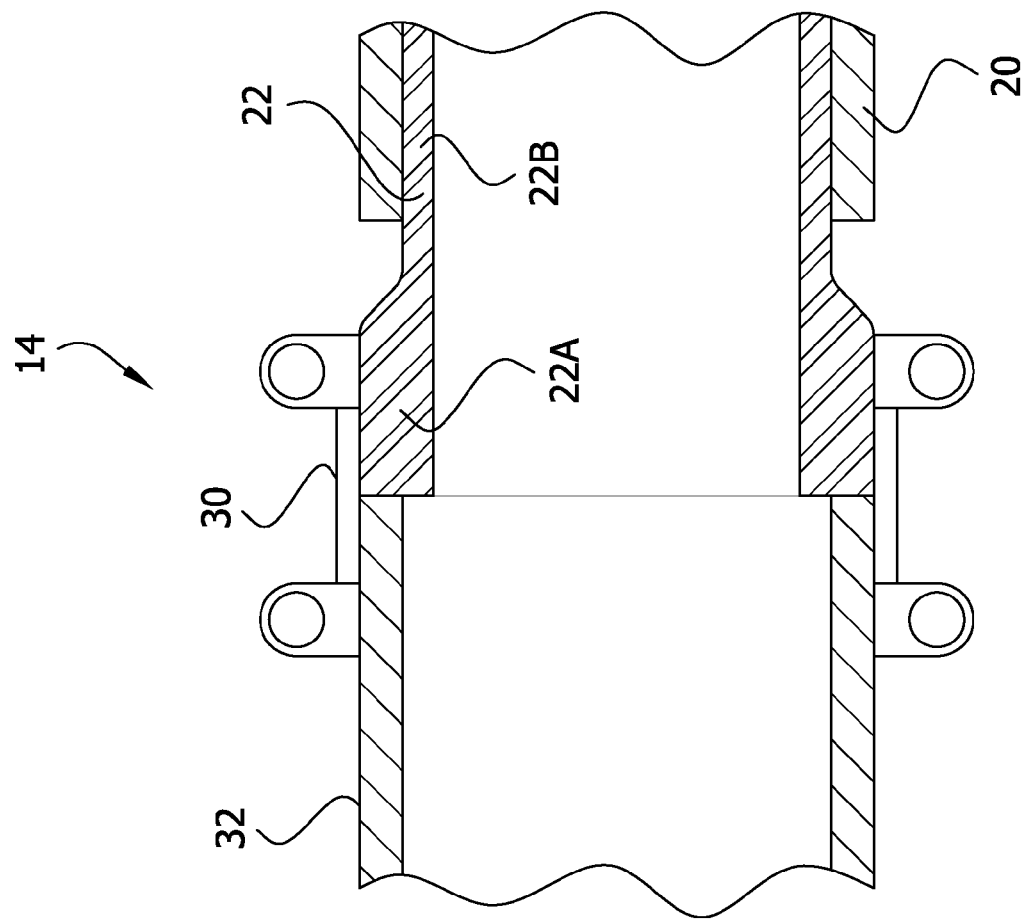
FIG. 2 is an enlarged fragmentary section of a cured in place liner to existing pipe joint of a first embodiment.

FIG. 2 shows the connecting joint 14 of FIG. 1 in more detail and illustrates a first embodiment of a connection between the existing pipe system and an end of the cured in place liner system 12. As explained above, the connecting joint 14 comprises the coupler 30, the liner coupling section 22A, and the pipe segment 32, but the pipe segment 32 may be omitted and the coupler and liner coupling section be used to connect the cured in place liner system directly in fluid communication with the existing pipe system. The joint to a pipe of the existing pipe system can be the same as the connection of the liner coupling section 22A to the pipe segment 32 illustrated in FIG. 2. A cured in place liner 22 of the liner system 12 is installed in a pipe 20 of the existing pipe system. A portion 22B of the cured in place liner 22 is inside the pipe 20 and conformed to an inner surface of the pipe. An end portion of the cured in place liner 22 forming the liner coupling section 22A extends out of the pipe 20. The liner coupling section 22A has an increased thickness relative to the portion 22B inside the pipe. For example, the portion 22B inside the pipe may have a thickness of about 3/16 inch (4.8 mm) The portion 22A may have a thickness of about 3/8 inch (9.5 mm). In other words, the portion 22A may be about two times thicker than the portion 22B. The thicknesses may be other than disclosed herein without departing from the scope of the present invention. The increased thickness provides greater resistance against buckling, which may be caused by force applied to the outside surface of the liner coupling section 22A by tightening or clamping of the coupler 30 on the liner coupling section. The increased thickness also provides the liner coupling section 22A with an increased outside diameter. The portion 22B inside the pipe 20 has an outside diameter approximately the same as the inside diameter of the pipe (e.g., about 8 inches (20 cm)). If the liner coupling section 22A were not increased in diameter, the liner coupling section may have the same outside diameter as the portion 22B inside the pipe. Commonly available and/or less expensive couplers 30 may not be constructed having a diameter corresponding to that of the inside diameter of the pipe 20. The increased diameter of the liner coupling section 22A is preferably about the same as the outside diameter of the pipe 20 (e.g., about 8.5 inches (22 cm)). Commonly available and/or less expensive couplers are likely constructed with diameters corresponding to the outside diameter of the pipe 20 and thus the outside diameter of the thickened liner coupling section 22A of the liner 22. Another advantage of the increased thickness of the liner coupling section 22A is that a coupler 30 having a constant diameter may be used. The coupler 30 forms a fluid-tight connection. The cured in placer liner 22 may contain reinforcement (e.g., carbon, glass, steel) that increases its buckling strength. The cured in place liner 22 is shown in abutting relationship with the pipe segment 32 in FIG. 2, but may be spaced from the pipe segment (as is the case with other types of terminal connections).

Figure 3:
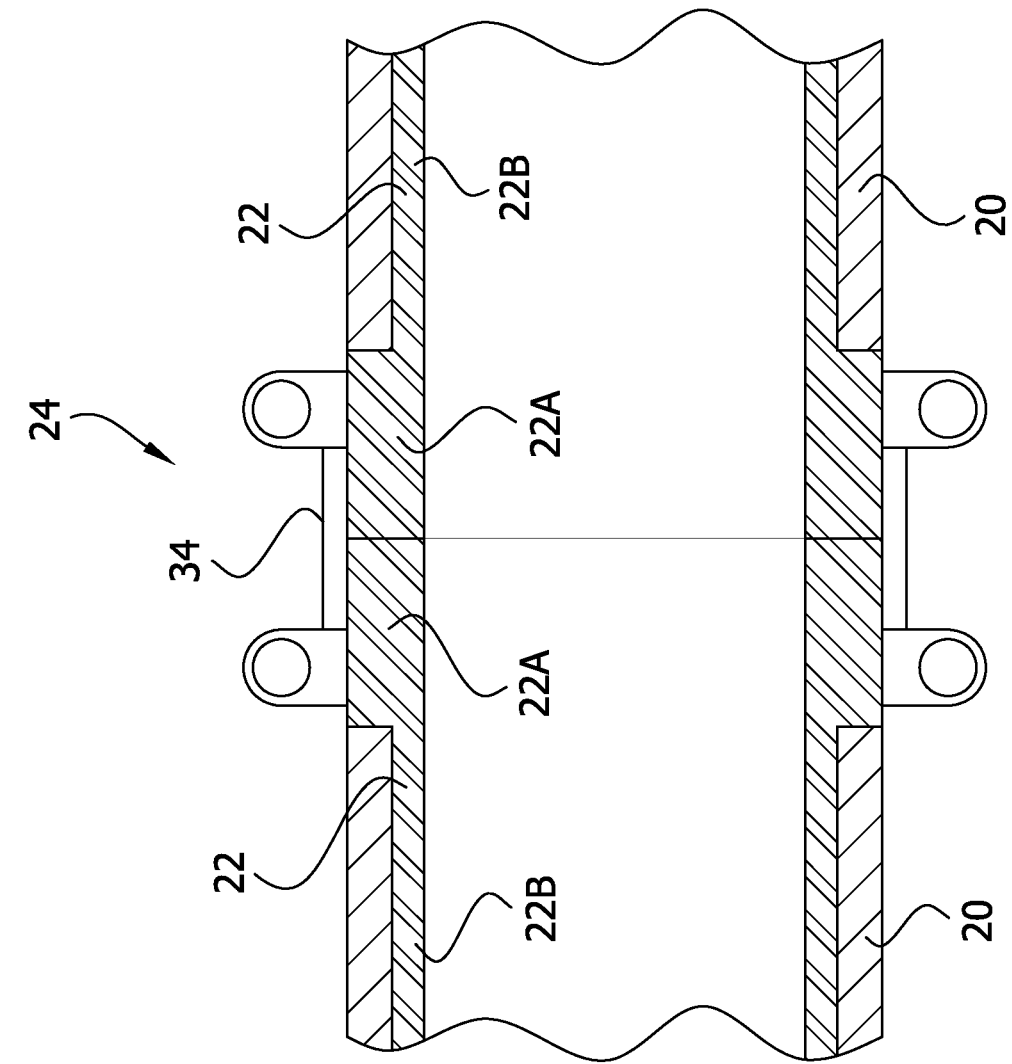
FIG. 3 is a fragmentary section of a cured in place liner to cured in place liner joint of a first embodiment.

FIG. 3 shows the connecting joint 24 of FIG. 1 in more detail and illustrates a first embodiment of a connection between adjacent cured in place liners 22 of the liner system 12. The liners 22 are shown installed in respective pipes 20 of the existing pipe system. The liners have portions 22B inside the pipes 20 and liner coupling sections 22A at their ends with increased thickness, similar to the liner coupling section 22A shown in FIG. 2. As explained above with reference to FIG. 2, the portions 22B inside respective pipes 20 may have a thickness of about 3/16 inch (4.8 mm), and the coupling sections 22A may have a thickness of about 3/8 inch (9.5 mm). In other words, the coupling sections 22A may be about two times thicker than the portions 22B. The thicknesses may be other than disclosed herein without departing from the scope of the present invention. A coupler 34 fluidly couples the liners 22. The thickened liner coupling sections 22A may have an outside diameter approximately the same as the outside diameter of the pipes 20 through which the liners are installed (e.g., about 8.5 inches (22 cm)). The thickened liner coupling sections 22A provide similar advantages as described above. For example, the liner coupling sections 22A have increased resistance against buckling. The connecting joint 24 forms a fluid-tight flow path between the liners. The cured in placer liners 22 may contain reinforcement (e.g., carbon, glass, steel) that increases their buckling strength. The coupler 34 may have a similar construction as the coupler 30 illustrated in FIG. 2. The cured in place liners 22 are shown in abutting relationship in FIG. 3, but may be spaced from each other (as is the case with other types of intermediate connections).

Figure 4A:
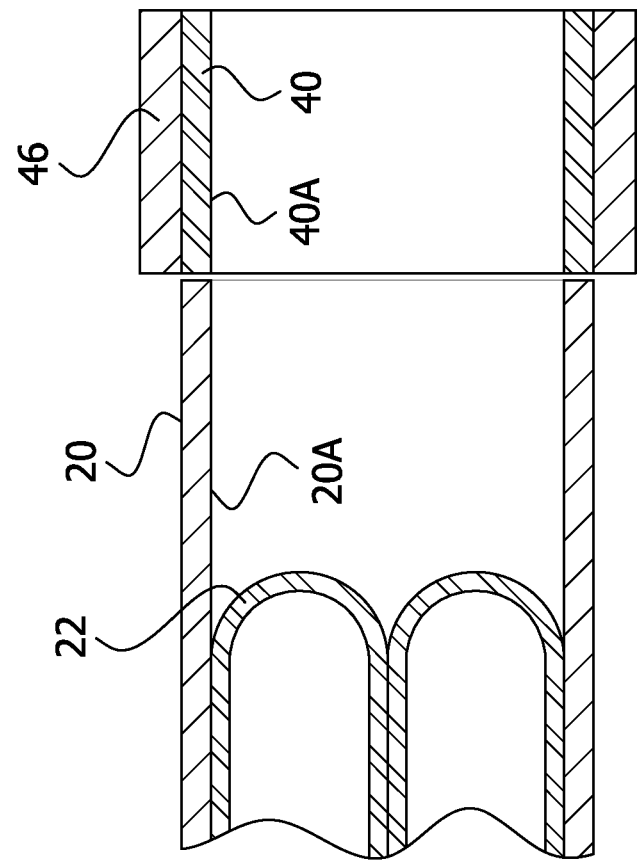
FIGS. 4A-4D are fragmentary sections illustrating a sequence of forming a cured in place liner having an end portion as illustrated in FIGS. 2 and 3.
Figure 4B:
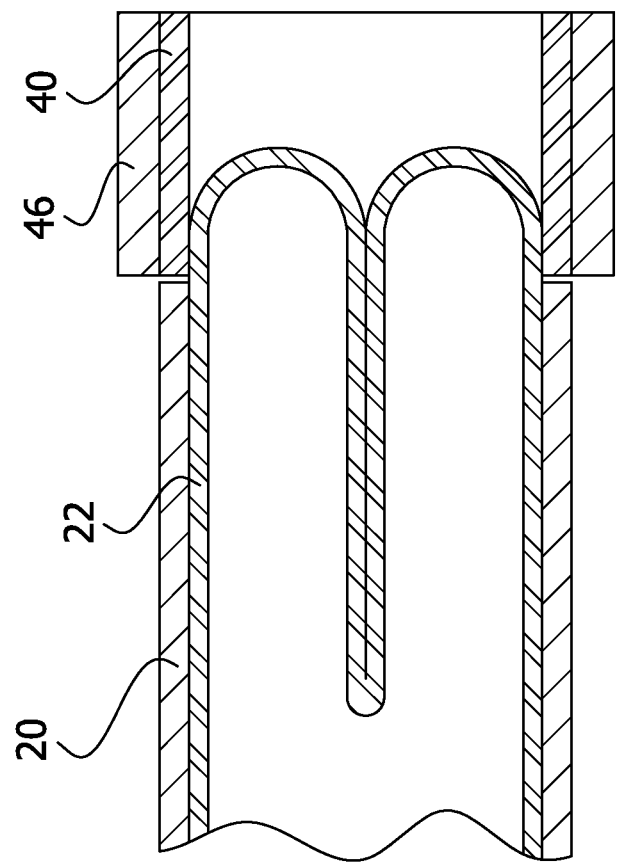
Figure 4C:
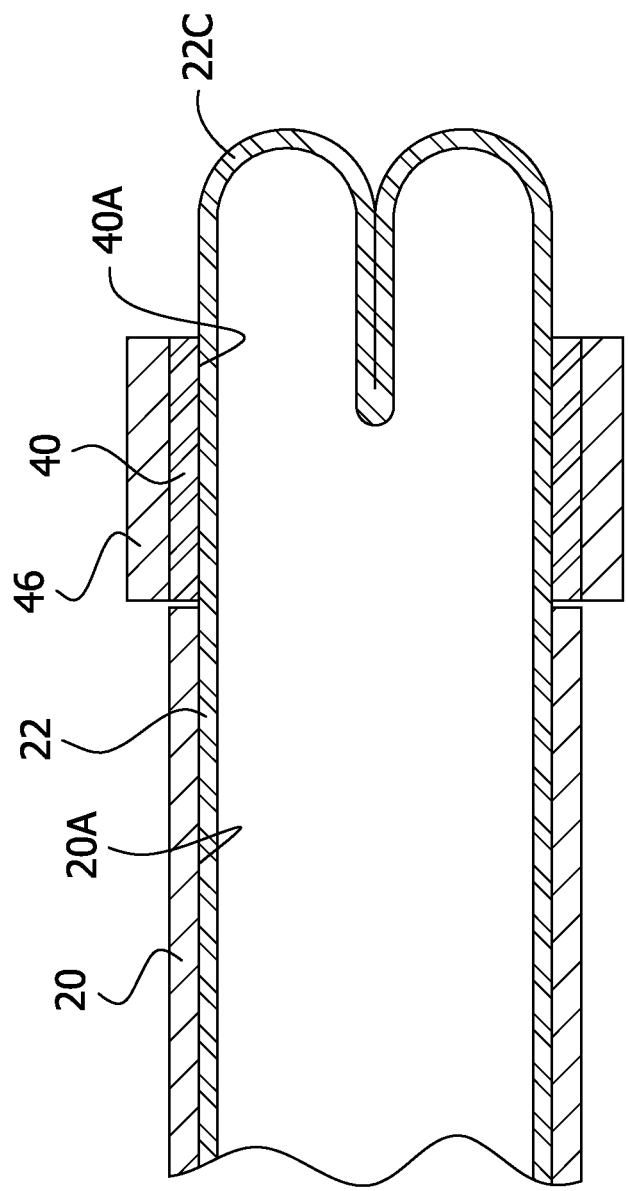
Figure 4D:
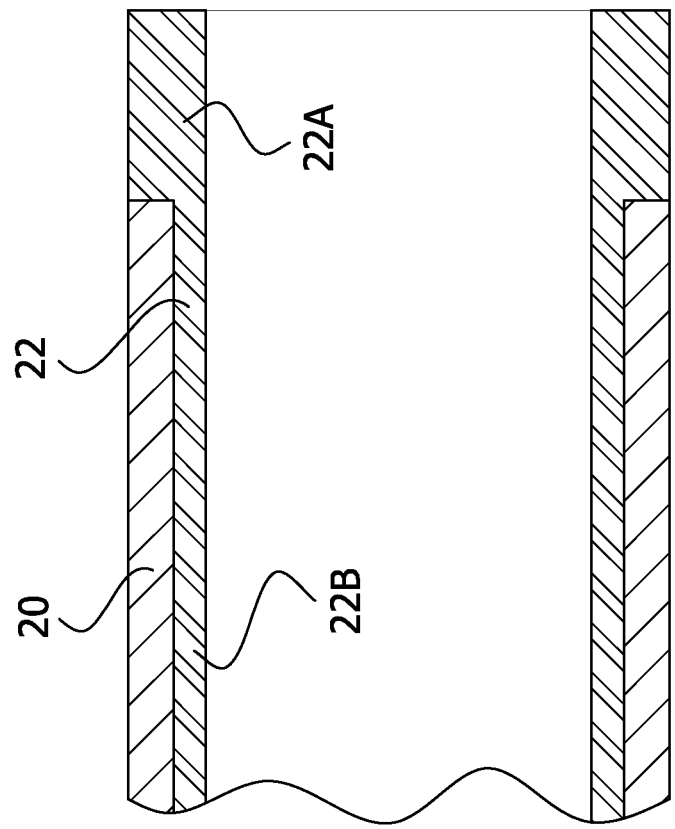

FIGS. 4A-4D illustrate in sequence a method that may be used to form a cured in place liner 22 having a thickened liner coupling section 22A like those shown in FIGS. 2 and 3. Referring to FIG. 4A, a resin impregnated tubular liner sleeve 40 is positioned in a tubular mold 46. The liner sleeve 40 may comprise the same material as the liner 22 or a different material. The resin impregnated liner sleeve 40 may be partially cured so that it has sufficient rigidity to maintain a tubular shape inside the mold 46. The mold 46 is separate and distinct from any of the pipes 20. The mold 46 is positioned adjacent to and in alignment with an existing pipe 20 into which a liner 22 will be inserted. As shown in sequence in FIGS. 4A-4C, the liner 22 is illustrated as being inserted into the pipe 22 by eversion (but may be inserted by other methods, including pull-in). The everting liner 22 advances within the pipe 20 until a terminal portion 22C of the liner 22 (FIG. 4C) extends out of the pipe 20 and into or through the sleeve 40 in the mold 46. The liner 22 may be everted using fluid pressure within the liner. The fluid pressure causes the liner 22 to conform to an inside surface 20A of the pipe 20 and conform to an inside surface 40A of the liner sleeve. The liner 20 and the liner sleeve 40 are cured (e.g., simultaneously) when in a configuration such as shown in FIG. 4C so that the liner sleeve cures on the outside of the liner and forms an integral part of the liner. In other words, the sleeve 40 bonds to the liner 20 to form the coupling section 22A. As shown in FIG. 4D, the terminal portion 22C of the liner is then removed (e.g., cut away), leaving the liner with a liner coupling section 22A extending out of the pipe having an increased thickness. The mold 46 may have an inside diameter approximately the same as the outside diameter of the existing pipe 20 so that the cured liner sleeve 40 has a corresponding outside diameter. The mold 46 may have other inside diameters (e.g., corresponding to an inside diameter of a desired coupler) without departing from the scope of the present invention. The cured liner coupling section 22A as illustrated in FIG. 4D is ready to have a coupler 30, 34 mounted thereon for connecting the liner in fluid communication with either the existing pipe system (e.g., FIG. 2) or another liner 22 (e.g., FIG. 3).

Various types of molds 46 may be used. The mold 46 may be a tubular mold with a continuous diameter, in which case the mold could be removed from the liner coupling section 22A by sliding it longitudinally off of the end portion. Alternatively, the mold 46 may be a clamshell or other construction that enables a "quick release" and perhaps more convenient removal from the liner coupling section 22A. The mold 46 may be made from various suitable materials such as a plastic or metal material. Lubrication may be applied to the inside surface of the mold 46 to facilitate removal from the cured liner sleeve 40. The mold 46 facilitates curing of the coupling section 22A in a predetermined desired configuration. For example, the mold 46 may have a generally circular inner profile for curing the coupling section 22A to have a generally circular outer profile. This enhances conformance of the coupling section 22A to the coupler 30, 34, which enhances the fluid seal between the coupling section and the coupler.

Figure 5:
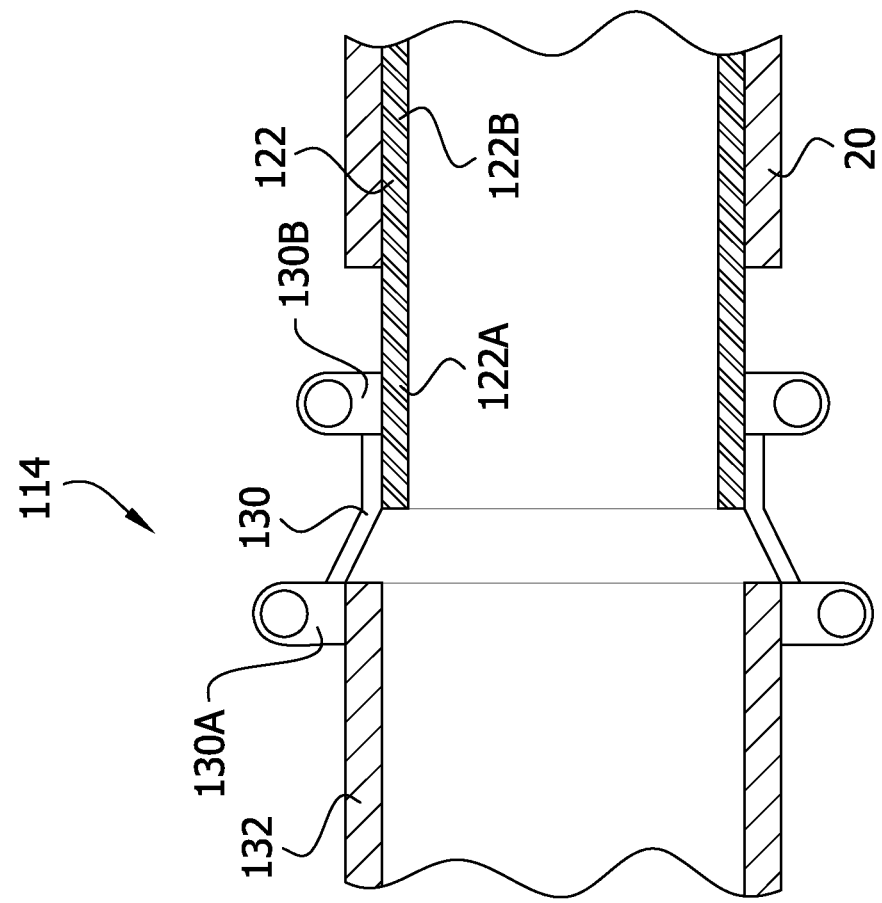
FIG. 5 is a fragmentary section of a cured in place liner to existing pipe joint of a second embodiment.

FIG. 5 shows the connecting joint 114 of FIG. 1 (in mirror image) in more detail. As explained above, the connecting joint 114 comprises the coupler 130, the liner coupling section 122A, and the pipe segment 132, but the pipe segment may be omitted and the coupler and liner coupling section be used to connect the cured in place liner system 12 directly in fluid communication with the existing pipe system. The connection may look the same as the connection of the liner coupling section to the pipe segment illustrated in FIG. 5. A cured in place liner 122 of the liner system 12 is shown installed in a pipe 20 of the existing pipe system. The connection of this embodiment is different than the connection shown in FIG. 2 in that the liner coupling section 122A of the liner 122 is not thickened and the coupler 130 is a reducing coupler. The liner coupling section 122A has approximately the same thickness as the portion of the liner 122B inside the pipe 20. The end portion 122A also has approximately same outside diameter as the portion 122B inside the pipe. The reducing coupler 130 has first and second ends 130A, 130B constructed with different diameters, the diameter of the first end 130A corresponding to the diameter of the pipe segment 132, and the diameter of the second end 130B corresponding to the diameter of the liner coupling section 122A. The coupler 130 forms a fluid-tight connection.

Figure 6:
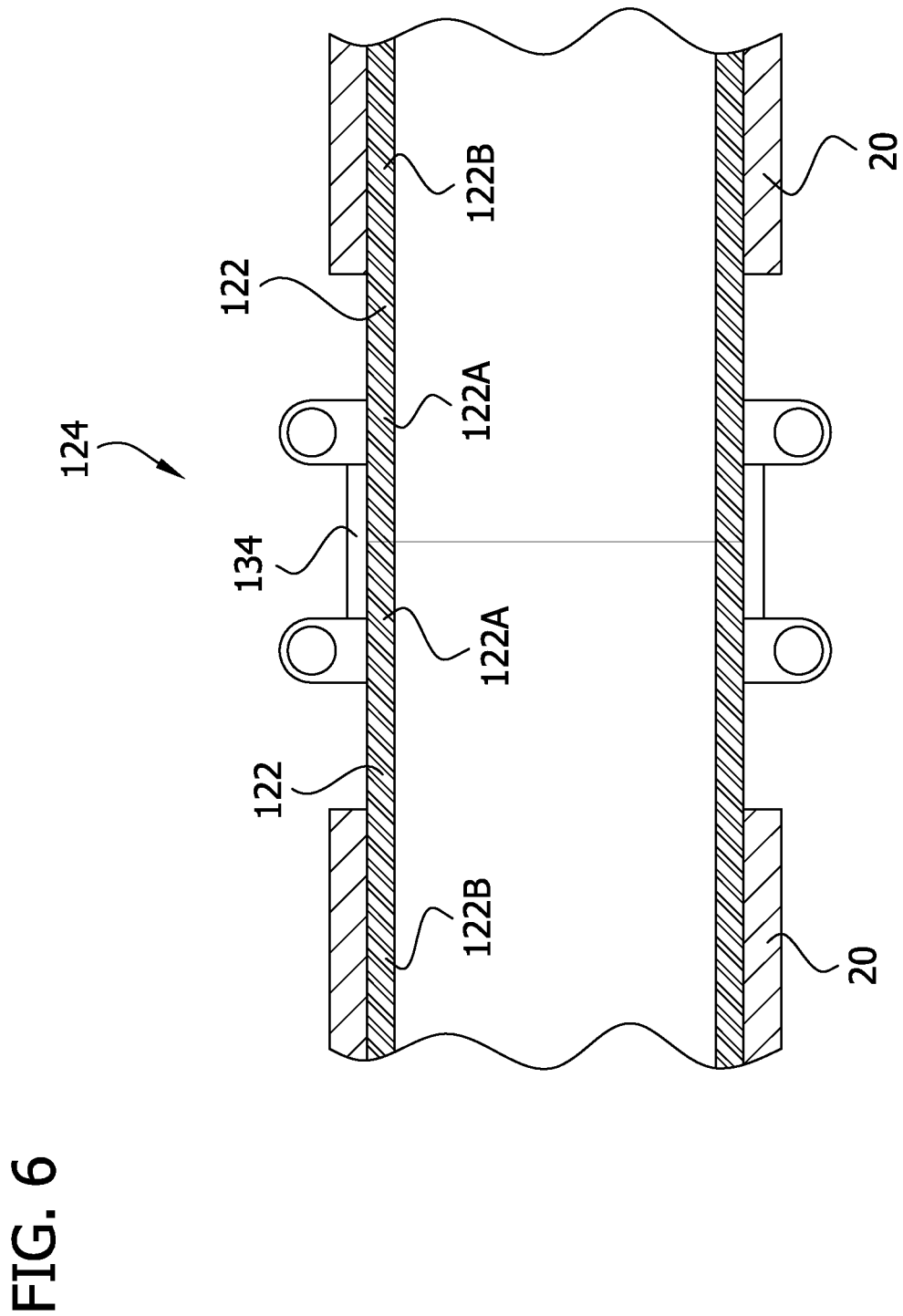
FIG. 6 is a fragmentary section of a cured in place liner to cured in place liner joint of a second embodiment.

FIG. 6 shows the connecting joint 124 of FIG. 1 in more detail and illustrates a second embodiment of a connection between adjacent cured in place liners 122 of the liner system 12. The liners 122 are shown installed in respective pipes 20 of the existing pipe system. The connection of this embodiment is different than the connection shown in FIG. 3 in that the liner coupling sections 122A of the liners have approximately the same thickness as the portions of the liners 122B inside the pipes 20. The liner coupling sections 122A also have approximately the same outside diameter as the respective portions 122B inside the pipes 20. A constant diameter coupler 134 may be used because the outside diameter of the liner coupling sections 122A is approximately the same. The cured in placer liners 122 may contain reinforcement (e.g., carbon, glass, steel) that increases its buckling strength without significantly increasing the thickness or outside diameter of the liner. The connecting joint 124 forms a fluid-tight flow path between the liners 122.

Figure 7A:
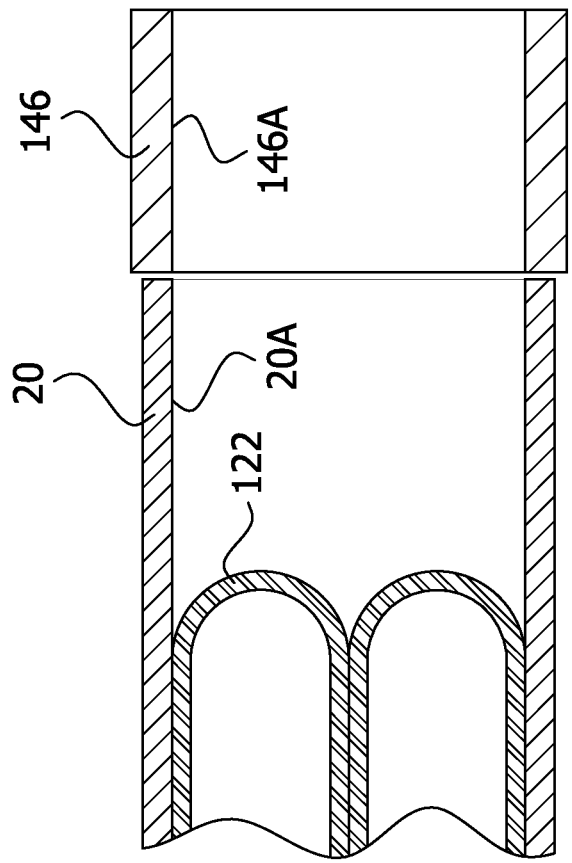
FIGS. 7A-7D are fragmentary sections illustrating a sequence of forming a cured in place liner having an end portion as illustrated in FIGS. 5 and 6.
Figure 7B:
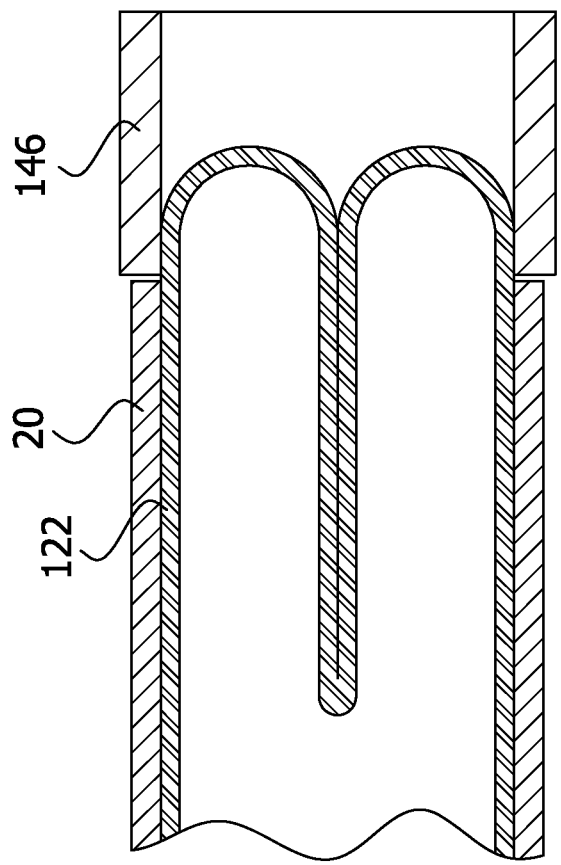
Figure 7C:
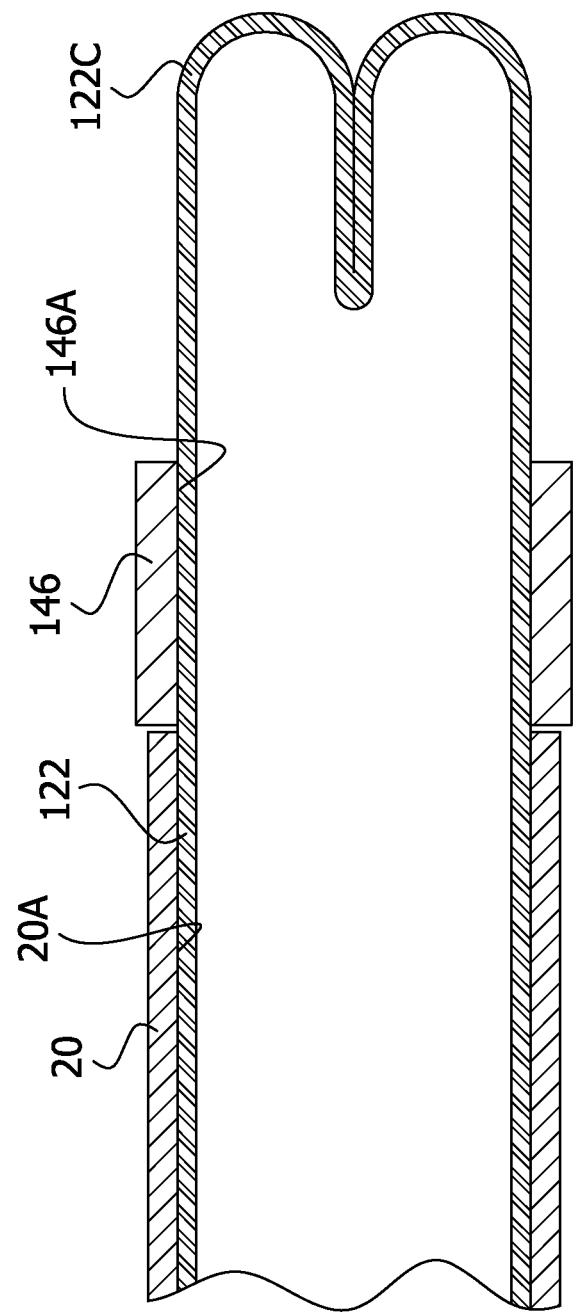
Figure 7D:
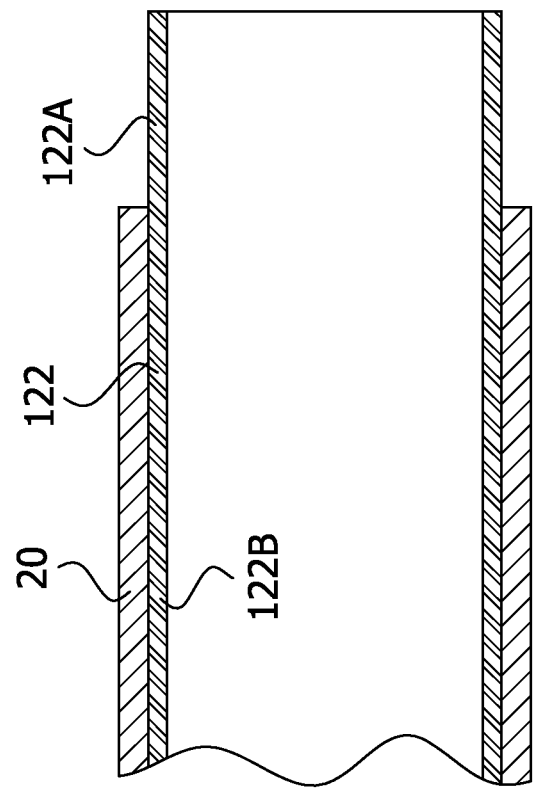

FIGS. 7A-7D illustrate in sequence a method that may be used to form a cured in place liner 122 having a liner coupling section 122A like those shown in FIGS. 5 and 6. Referring to FIG. 7A, a mold 146 is positioned adjacent and in alignment with an existing pipe 20 through which a liner 122 will be inserted. The mold 146 may have a construction similar to the construction of the mold 46 described above. In this embodiment, the inside diameter of the mold 146 is approximately the same as the inside diameter of the pipe 20. As shown in sequence in FIGS. 7A-7C, the liner 122 is illustrated as being inserted into the pipe 20 by eversion (but may be inserted by other methods, including pull-in). The everting liner 122 advances within the pipe 20 until a terminal portion 122C of the liner 122 (FIG. 7C) extends out of the pipe and into or through the mold 146. The liner 122 may be everted using fluid pressure within the liner. The fluid pressure causes the liner 122 to conform to an inside surface 20A of the pipe 20 and conform to an inside surface 146A of the mold 146. The liner 122 is cured when in a configuration such as shown in FIG. 7C so that the segment of the liner extending out of the pipe cures having a diameter approximately the same as the inside diameter of the mold. As shown in FIG. 7D, the terminal portion 122C is then removed (e.g., cut away), leaving the liner with a liner coupling section 122A extending out of the pipe 20 having an outside diameter approximately the same as the inside diameter of the pipe. In other words, the end portion 122A and the portion of the liner 122B inside the pipe 20 have generally the same outside diameter. As explained above with respect to coupling sections 22A, the mold 146 facilitates curing of the coupling sections 122A in a predetermined desired configuration (e.g., having a generally circular outer profile). The cured end portion 122A as illustrated in FIG. 7D is ready to have a coupler 130, 134 mounted thereon for connecting the liner 122 in fluid communication with either the existing pipe system (e.g., FIG. 5) or another liner 122 (e.g., FIG. 6).

Figure 8:
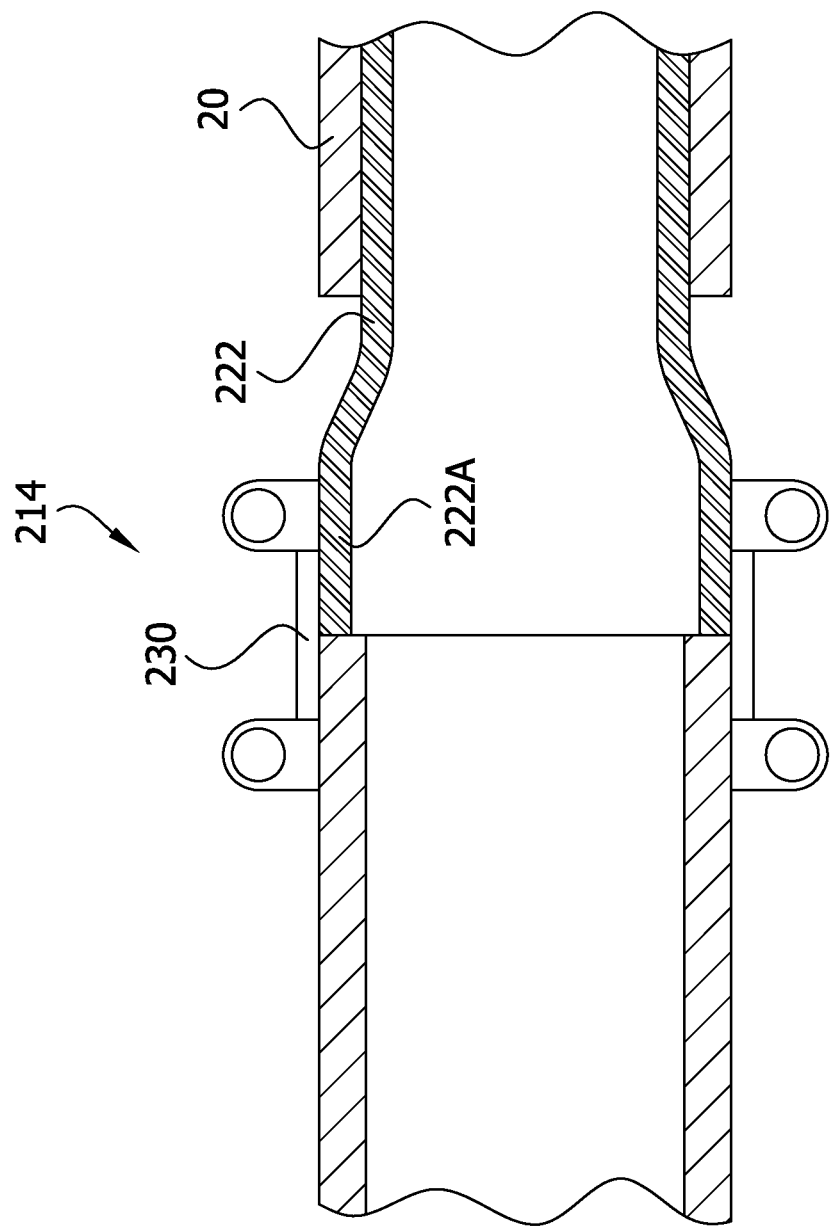
FIG. 8 is a fragmentary section of a cured in place liner to existing pipe joint of a third embodiment.

FIG. 8 shows a third embodiment of a connecting joint 214 between the existing pipe system and an end of the cured in place liner system 12. As with the prior embodiments, the connecting joint 214 comprises a coupler 230 and a liner coupling section 222A. In this embodiment, the liner coupling section 222A has an increased diameter but substantially constant thickness. The outside diameter of the end portion 222A is approximately the same as the outside diameter of the pipe 20 so that a constant diameter coupler 230 may be used.

Figure 9:
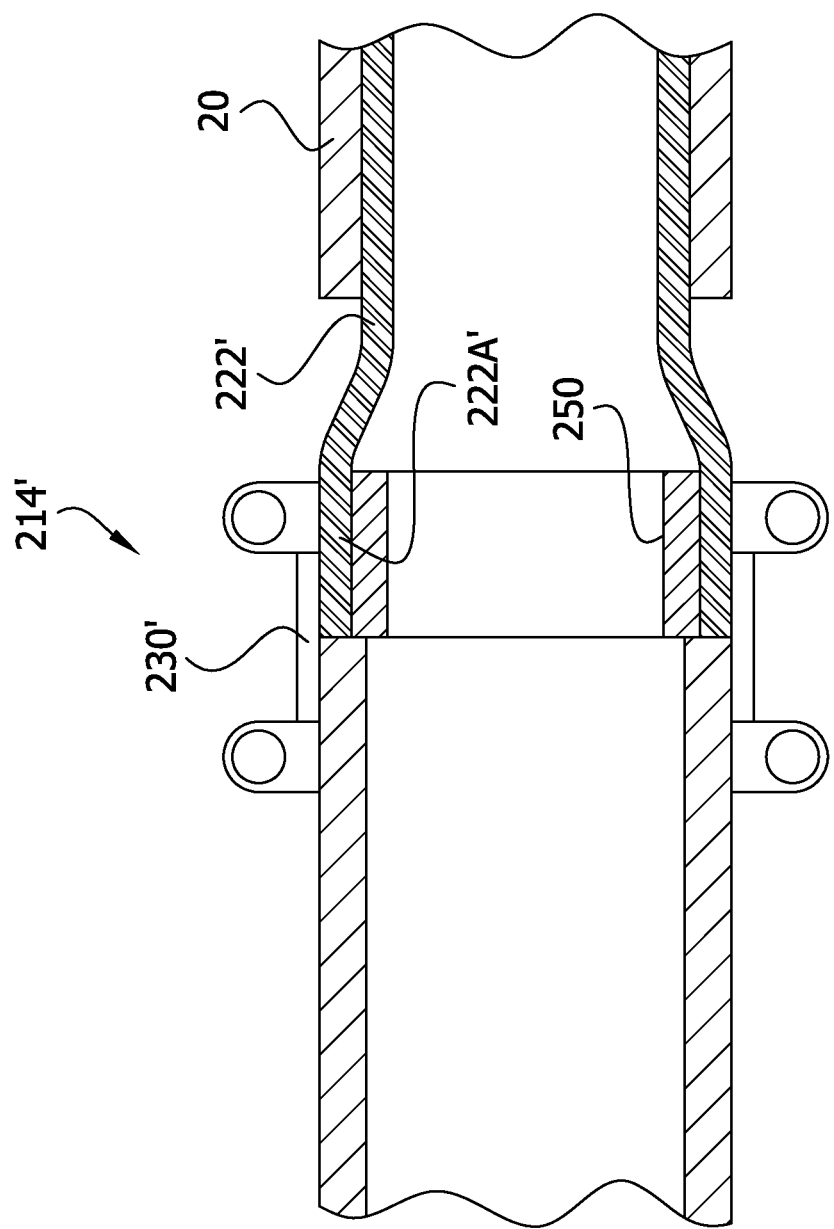
FIG. 9 is a fragmentary section of a cured in place liner to existing pipe joint which is similar to the embodiment shown in FIG. 8 but including a reinforcing member.

FIG. 9 shows a modified version 214' of the connecting joint 214. The joint 214' is similar to the joint 214 in that it is a terminal connection. The connecting joint 214' includes a coupler 230', and the liner 222' includes a coupling section 222A'. In this modified version, a reinforcing member 250 is provided inside the liner 222' to underlie the liner coupling section 222A'. The reinforcing member 250 may be tubular and have an outside diameter generally corresponding to the inside diameter of the liner coupling section 222A'. The reinforcing member 250 can be inserted in the liner coupling section 222A' before or after cure of the liner 222' and could be adhered to the liner using an epoxy, for example. The reinforcing member 250 may comprise carbon, glass, steel and/or other reinforcing material. In one embodiment, the reinforcing member 250 comprises resin impregnated material which is cured and bonds to the liner 222'. Alternatively or in addition, the reinforcing member 250 may include a substance such as an epoxy applied to the inside or outside surface of the end portion. The reinforcing member 250 provides the liner coupling section 222A' with greater resistance against buckling. Such reinforcing members may be used in other embodiments of terminal connections (e.g., the embodiment shown in FIG. 2) without departing from the scope of the present invention.

Figure 10:
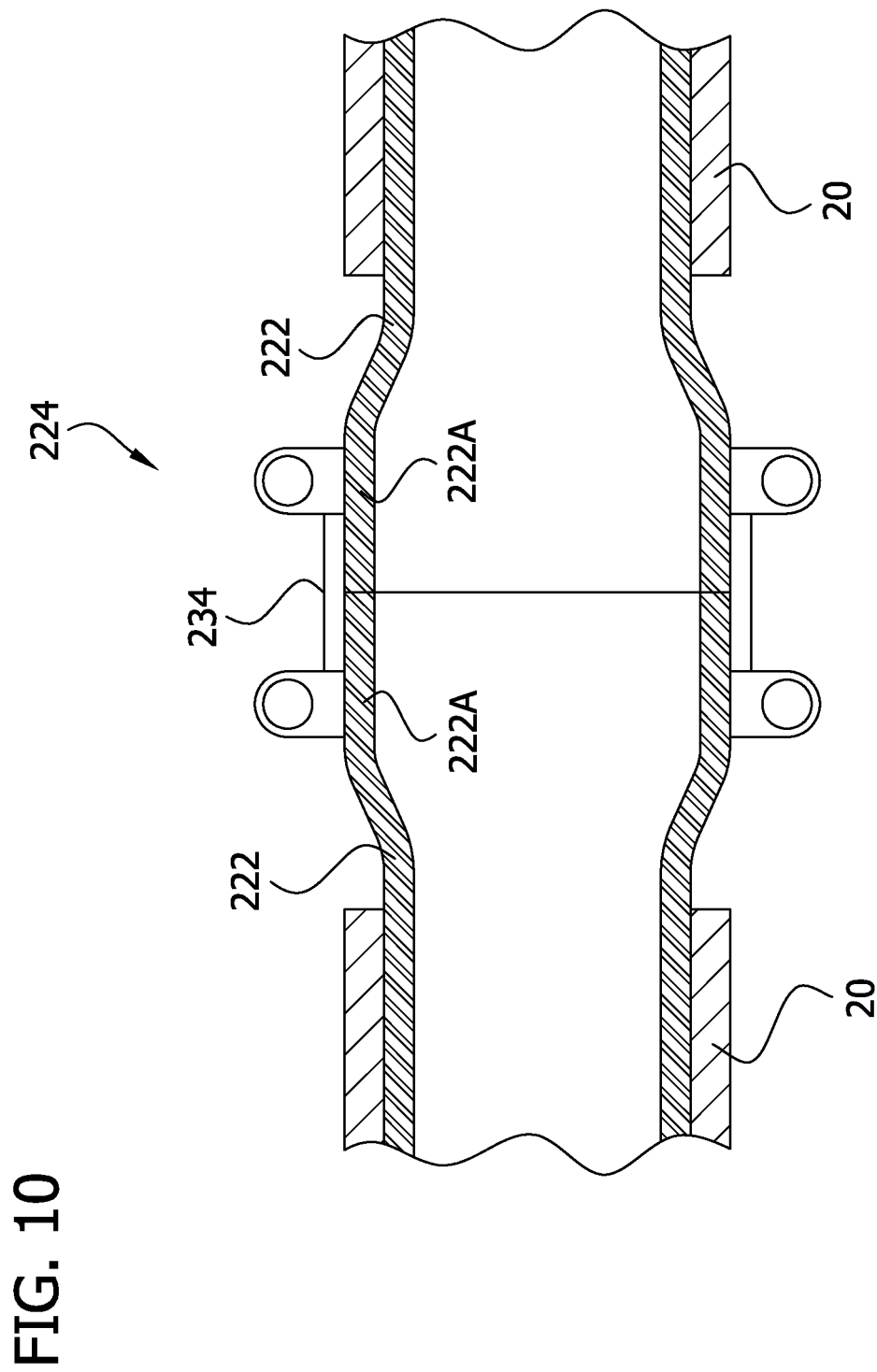
FIG. 10 is a fragmentary section of a cured in place liner to cured in place liner joint of a third embodiment.

FIG. 10 shows a third embodiment of a connecting joint 224 between adjacent cured in place liners 222 of the cured in place liner system 12. As in the prior embodiments, this joint 224 includes a coupler 234 and liner coupler sections 222A. The liner coupling sections 222A have increased diameters but substantially constant thicknesses. The outside diameters of the liner coupling sections 222A may be approximately the same as the outside diameters of the pipes 20. Desirably, the increased outside diameters of the liner coupling sections 222A are approximately the same so that a constant diameter coupler 234 may be used.

Figure 11:
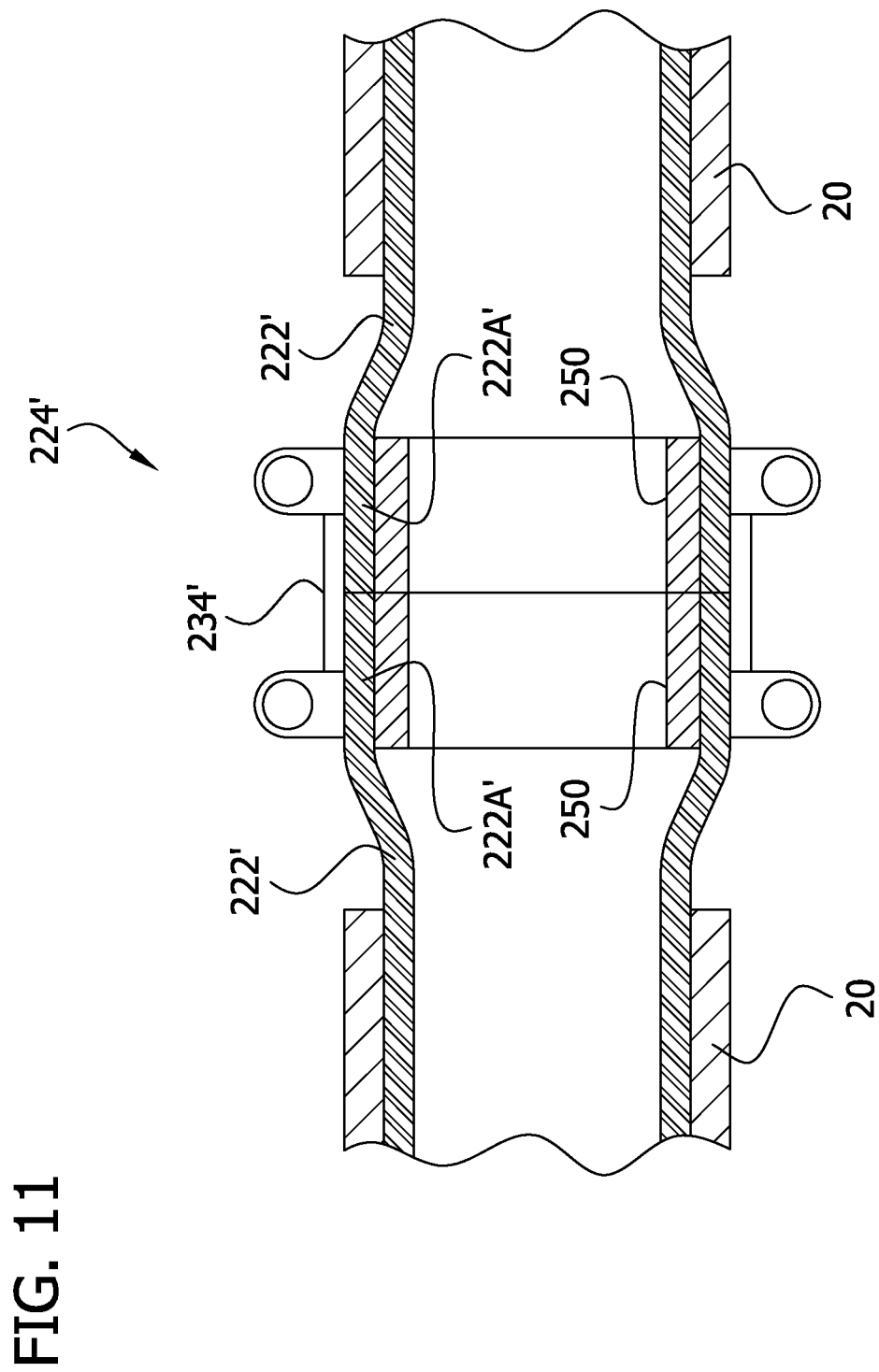
FIG. 11 is a fragmentary section of a cured in place liner to cured in place liner joint which is similar to the embodiment shown in FIG. 10 but including reinforcing members.

FIG. 11 shows a modified version 224' of the connecting joint 224. The joint 224' is similar to the joint 224 in that it is an intermediate connection. The connecting joint 224' includes a coupler 234', and the liners 222' each include a coupling section 222A'. In this modified version, a reinforcing member 250 is provided inside each liner 222' to underlie the liner coupling sections 222A'. The reinforcing members 250 may be tubular and have an outside diameter generally corresponding to the inside diameter of the liner coupling sections 222A'. The reinforcing member 250 can be inserted in the liner coupling sections 222A' before or after cure of the liners 222' and could be adhered to the liner using an epoxy, for example. The reinforcing members 250 may have a construction as described above with respect to FIG. 9. The reinforcing members 250 provides the liner coupling sections 222A' with greater resistance against buckling. Such reinforcing members may be used in other embodiments of intermediate connections (e.g., the embodiment shown in FIG. 3) without departing from the scope of the present invention.

Figure 12A:
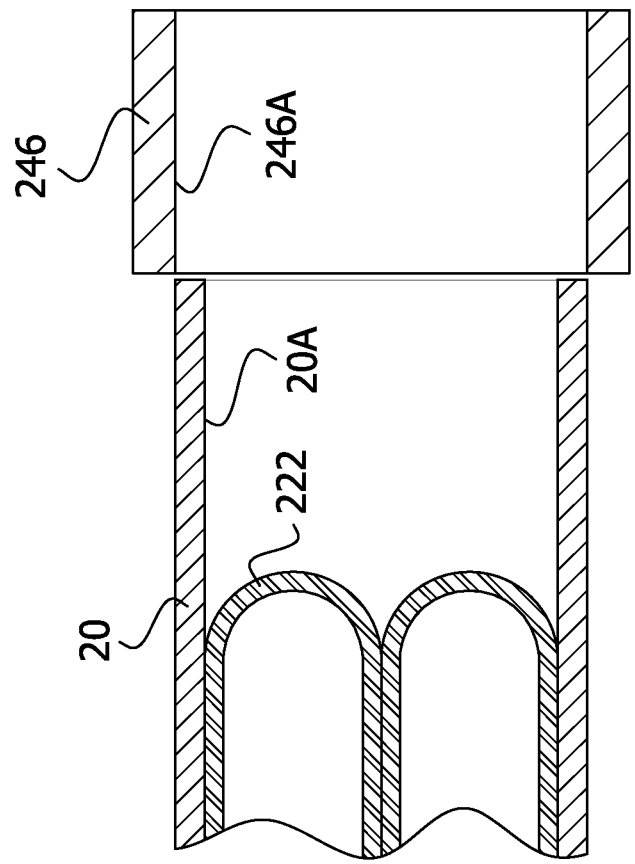
FIGS. 12A-12D are fragmentary sections illustrating a sequence of forming a cured in place liner having an end portion as illustrated in FIGS. 8 and 9.
Figure 12B:
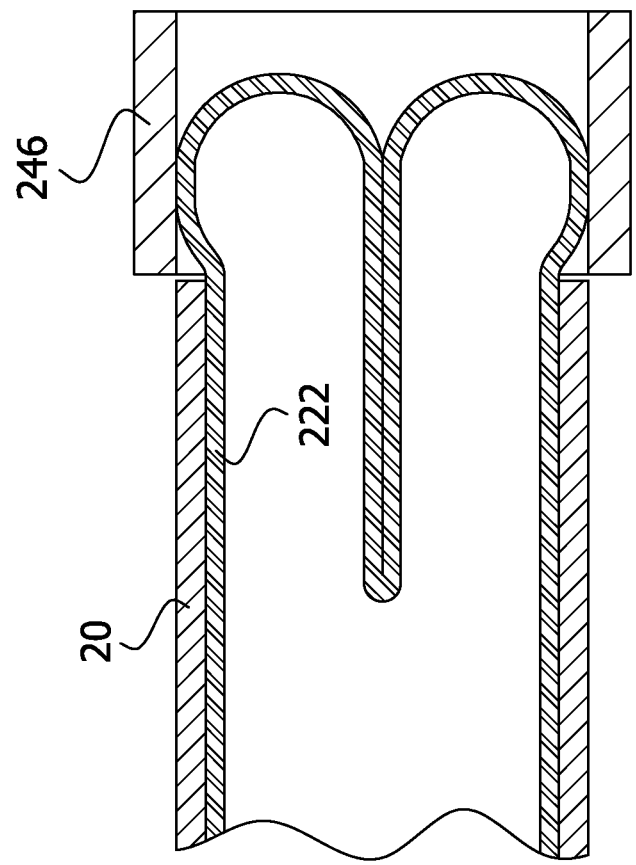
Figure 12C:
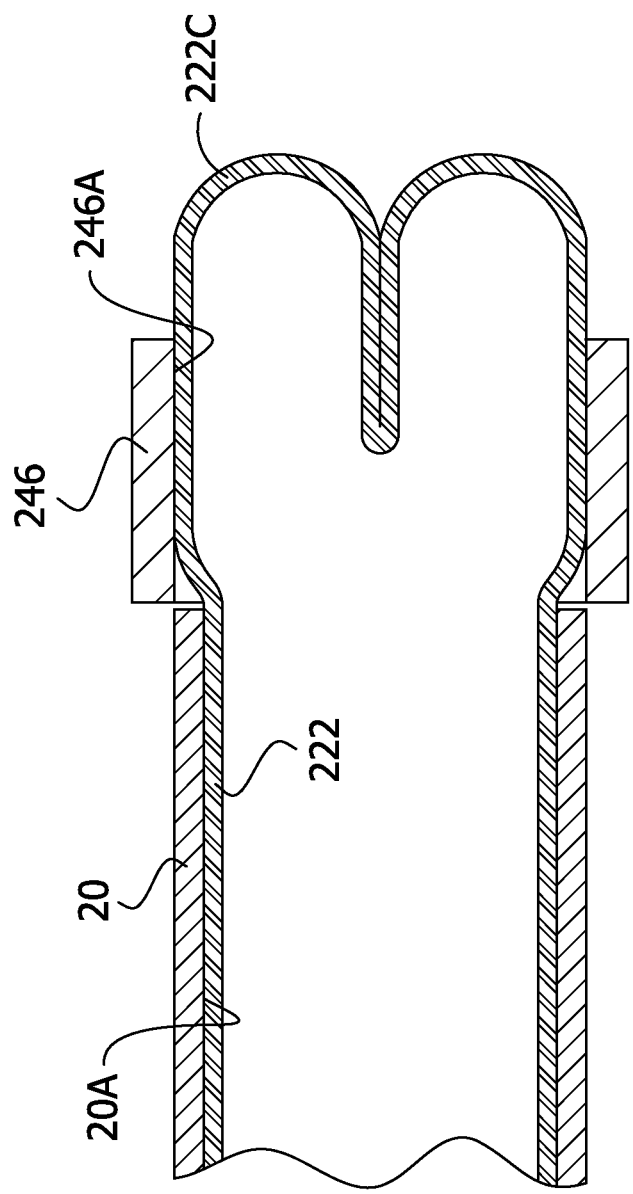
Figure 12D:
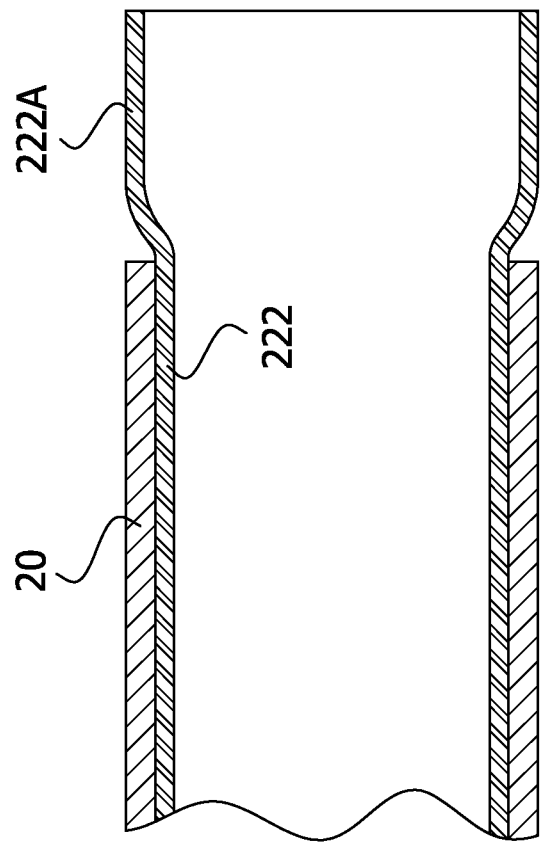

FIGS. 12A-12D illustrate in sequence a method that may be used to form a cured in place liner 222 having an end portion 222A like those shown in FIGS. 8 and 10. Referring to FIG. 12A, a mold 246 is positioned adjacent and in alignment with an existing pipe 20 through which a liner 222 will be inserted. In this embodiment, the inside diameter of the mold 246 is approximately the same as the outside diameter of the pipe 20. As shown in sequence in FIGS. 12A-12C, the liner 222 is illustrated as being inserted into the pipe 20 by eversion (but may be inserted by other methods, including pull-in). The everting liner 222 advances within the pipe 20 until a terminal portion 222C of the liner extends out of the pipe and into or through the mold 246. The liner 222 may be everted using fluid pressure within the liner. The fluid pressure causes the liner 222 to conform to an inside surface 20A of the pipe 20 and conform to an inside surface 246A of the mold 246. As with the molds described above, the mold 246 facilitates curing of the coupling section 222A in a predetermined desired configuration (e.g., having a generally circular outer profile). The liner 222 is cured when in a configuration such as shown in FIG. 12C so that the segment of the liner extending out of the pipe 20 cures having a diameter approximately the same as the inside diameter of the mold 246. As shown in FIG. 12D, the terminal portion 222C of the liner is then removed (e.g., cut away), leaving the liner with a liner coupling section 222A extending out of the pipe having a diameter approximately the same as the outside diameter of the pipe. The cured end portion as illustrated in FIG. 12D forms a liner coupling section 222A ready to have a coupler 230, 234 mounted thereon for connecting the liner 222 in fluid communication with either the existing pipe system or another liner 222 such as shown in FIGS. 8 and 10, respectively. If desired, reinforcing members 250 may be inserted into the liner to form coupling sections 222A' for making connections such as those shown in FIGS. 9 and 11.

Figure 13:
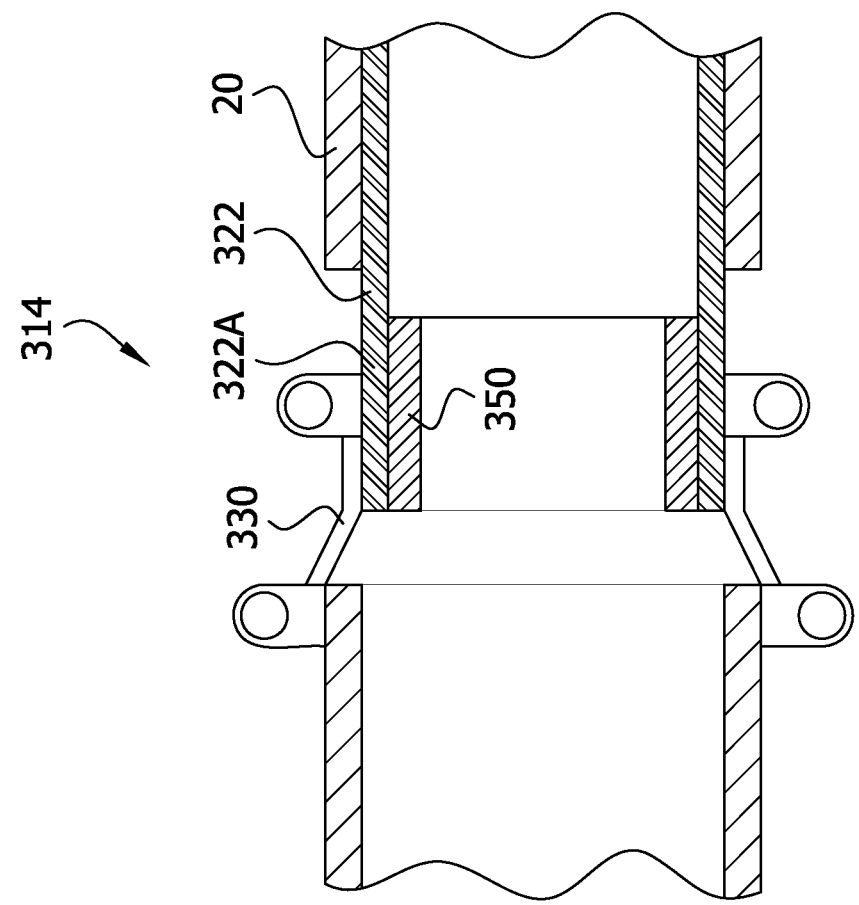
FIG. 13 is a fragmentary section of a cured in place liner to existing pipe joint of a fourth embodiment similar to the joint illustrated in FIG. 5 but including a reinforcing member.

FIG. 13 shows a fourth embodiment of a connecting joint 314 between the existing pipe system and an end of the cured in place liner system 12. This embodiment is similar to the embodiment shown in FIG. 5. A reducing coupler 330 is used to couple the liner coupling section 322A which has a smaller outside diameter than the pipe 20. In this embodiment, the liner coupling section 322A includes a reinforcing member 350 is inserted inside the liner coupling section 322A. The reinforcing member 350 may be similar to the reinforcing members 250 described above with respect to FIGS. 9 and 11. The reinforcing member 350 provides the liner coupling section 322A with greater resistance against buckling.

Figure 14:
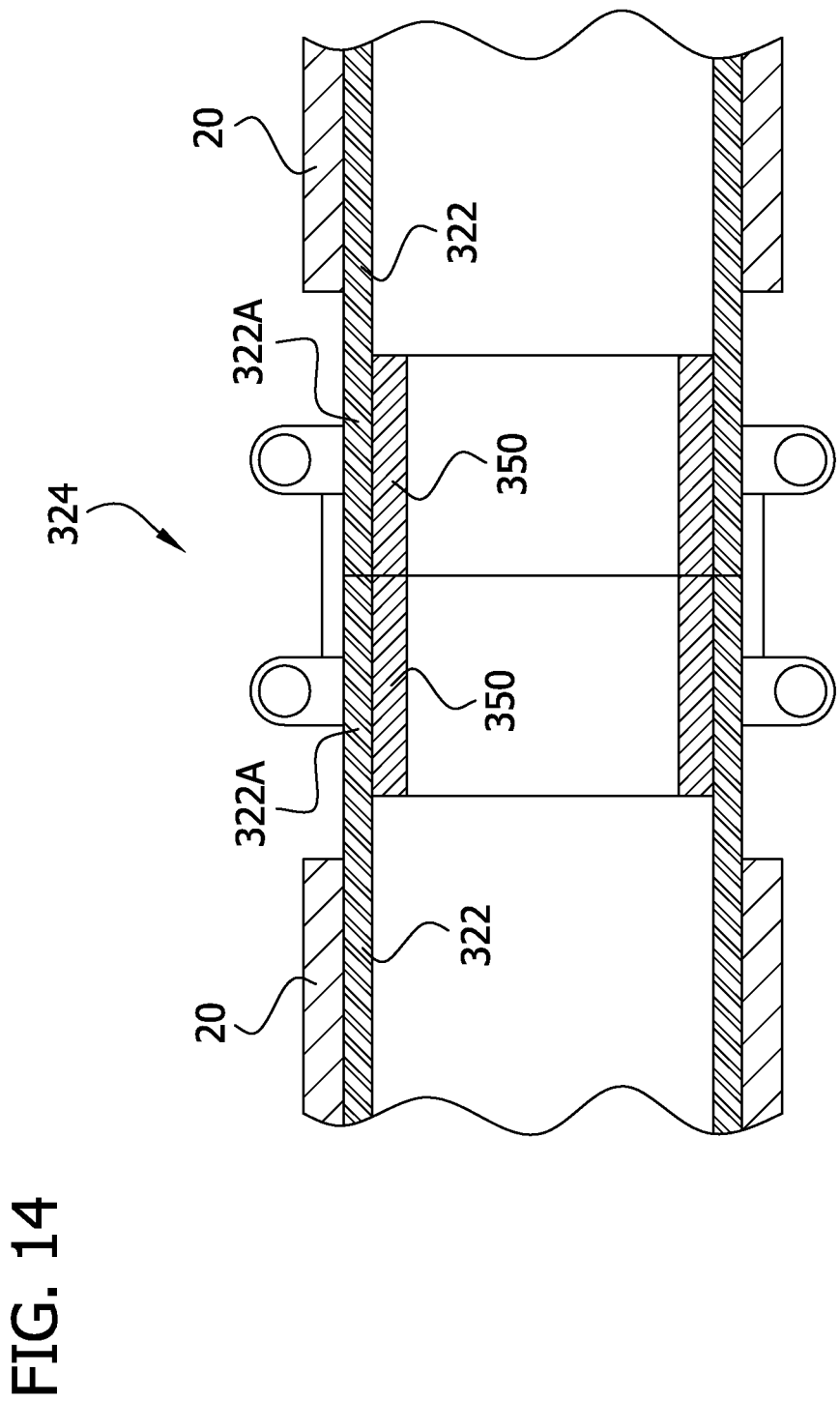
FIG. 14 is a fragmentary section of a cured in place liner to cured in place liner joint of a fourth embodiment similar to the joint illustrated in FIG. 6 but including reinforcing members.

FIG. 14 illustrates a fourth embodiment of a connecting joint 324 between adjacent cured in place liners 322 of the cured in place liner system 12. This embodiment is similar to the one shown in FIG. 6 but includes two reinforcing members 350 inserted inside respective end portions 322B. The reinforcing members 350 may be similar to those described above with respect to FIGS. 9 and 11. For example, a continuous reinforcing member that spans between the liner coupling sections of each liner may be used instead of two separate reinforcing members 350, as illustrated. The reinforcing members provide the liner coupling sections 322A with greater resistance against buckling.

Figure 15:
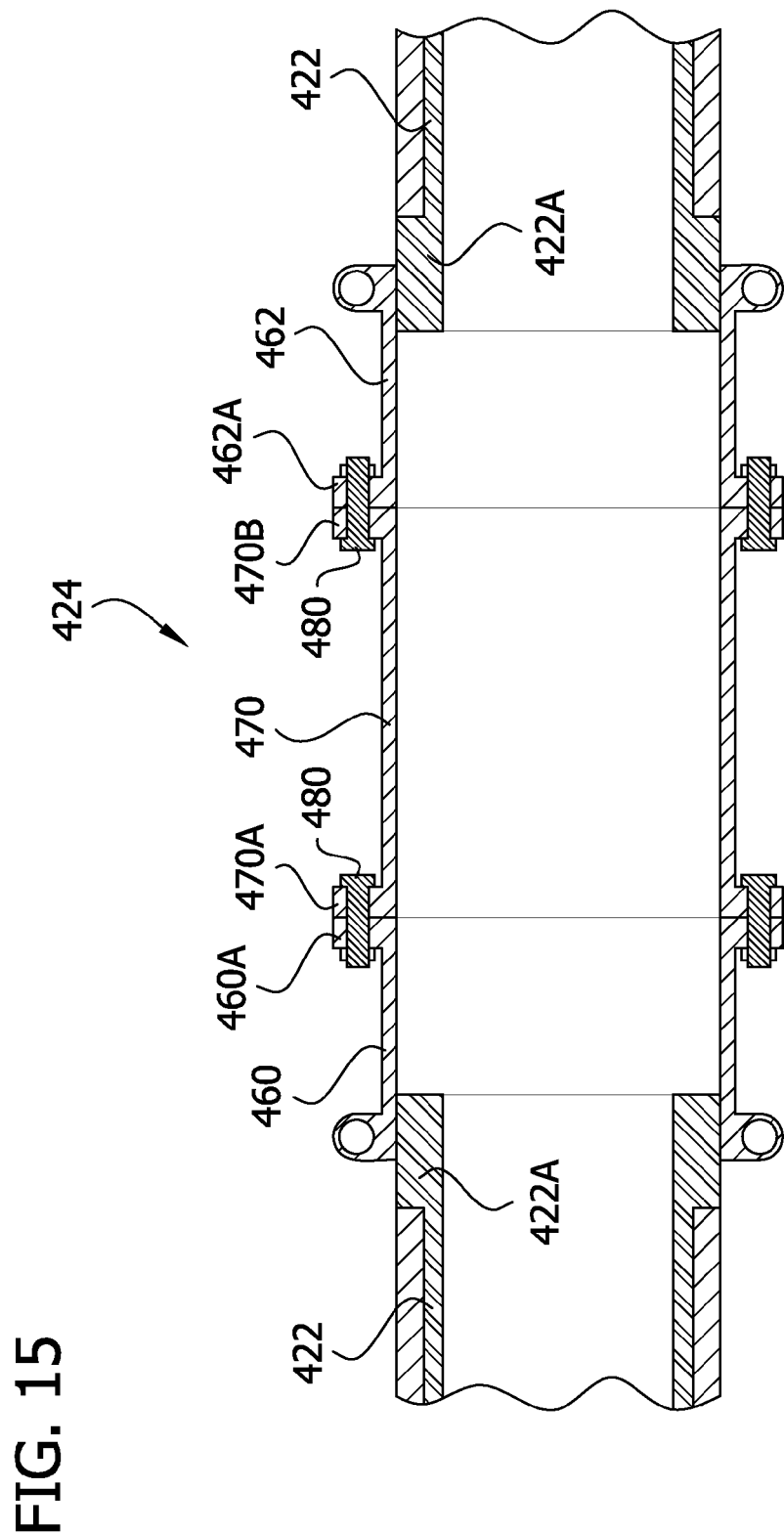
FIG. 15 is a fragmentary section of a cured in place liner to cured in place liner joint of a fifth embodiment including a bridge member.

FIG. 15 illustrates a fifth embodiment of a connecting joint 424 between adjacent cured in place liners 422 of the cured in place liner system 12. In this embodiment, the connecting joint 424 comprises first and second couplers 460, 462 and a bridge member 470 (or "spool"). The first and second couplers 460, 462 are illustrated as constant diameter couplers but one or both may comprise reducing couplers. The couplers 460, 462 form a fluid-tight connection with the bridge member 470 by connection of flanges 460A, 462A on the couplers to corresponding flanges 470A, 470B on the bridge member 470 (e.g., using bolts 480). Alternatively, the bridge member 470 and couplers 460, 462 may not have flanges 460A, 462A, in which case couplers may overlap and form a liquid-tight seal about an outer surface of the bridge member 470 as they do with the cured in place liners 422. The illustrated liner coupling sections 422A have increased thicknesses, like the embodiments shown in FIGS. 2 and 3, but other types of liner coupling sections may be used, such as those shown in FIGS. 5, 6, 8-11, 13, and 14. Although the bridge member 470 is illustrated in FIG. 15 as part of an intermediate connection, such a bridge member may also be used as part of a terminal connection (e.g. in the embodiment of FIG. 2). The bridge member 470 facilitates installation of the cured in place liner system 12 because the liner coupling sections 422A may be spaced relatively far from each other. Thus, the installation of the cured in place liners 422 (including insertion and cure) can be carried out without close precision regarding positioning the liner coupling sections 422A of the liners proximate each other. The bridge member 470 can be selected with a suitable length to bridge the gap between the liner coupling sections 422A such that the couplers 460, 462 are positioned properly for sealing about the liner coupling sections. The connecting joint 424 forms a fluid-tight flow path between the liners 422. Bridge members such as the bridge member 470 may be used in any of the connections disclosed herein or connections having other configurations without departing from the scope of the scope of the present invention.

Figure 16:
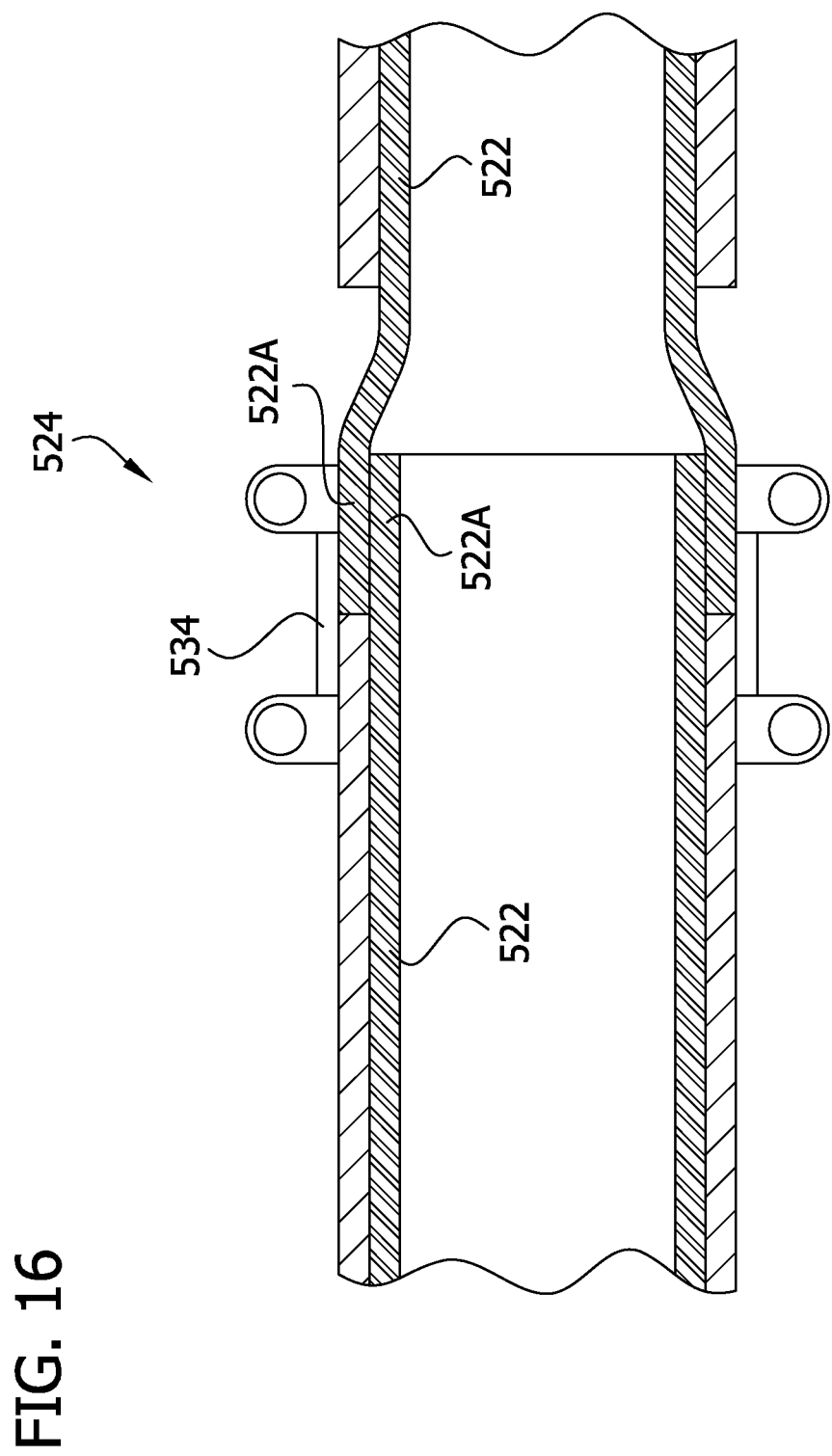
FIG. 16 is a fragmentary section of a cured in place liner to cured in place liner joint of a sixth embodiment.

FIG. 16 illustrates a sixth embodiment of a connecting joint 524 between adjacent cured in place liners 522 of the cured in place liner system 12. In this embodiment, the liners 522 are installed such that the end portions 522A of the liners (defining liner coupling sections) overlap each other. The liners 522 are cured in this condition so that the liners form a fluid-tight seal between the liner coupling sections 522A. Alternatively or in addition, a coupler 534 may be used to couple and form a fluid-tight seal between the liner coupling sections 522A. As another alternative, a band (not shown) may be disposed and tightened about the overlapping liner coupling sections 522A to seal the liner couplings sections together without forming a seal with one of the pipes 20. Other embodiments in which the end portions of the liners 522 overlap may be used.

Figure 17:
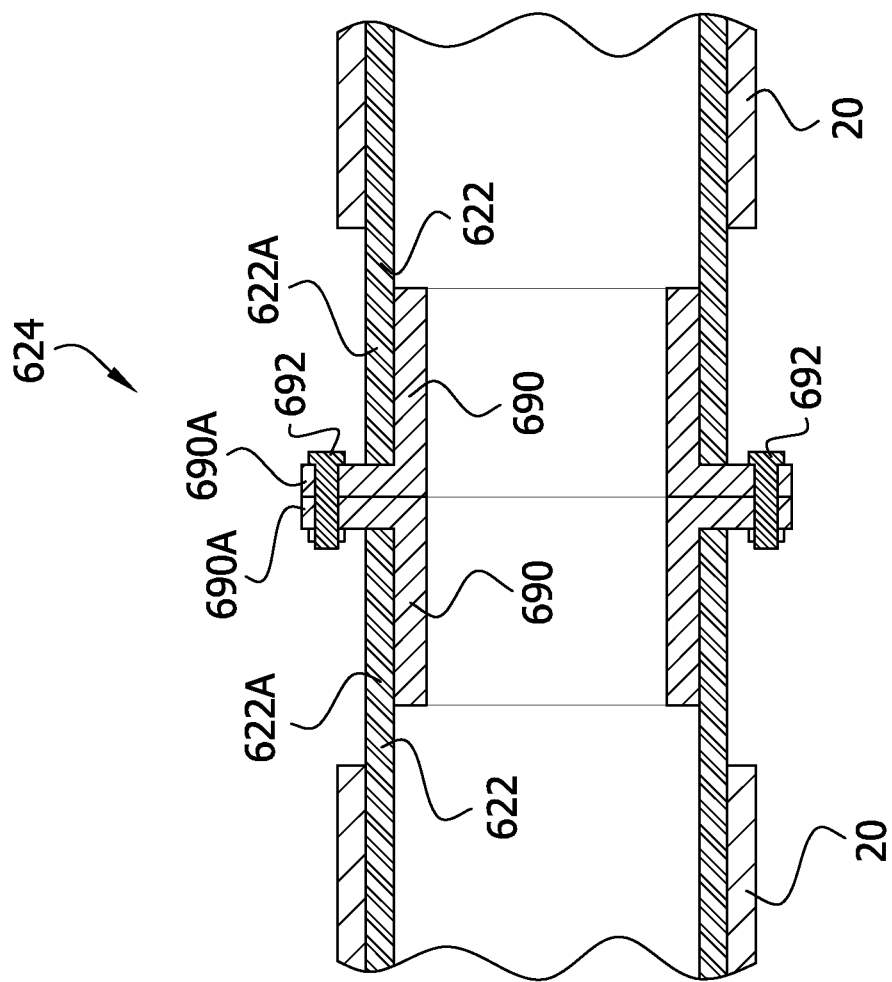
FIG. 17 is a fragmentary section of a cured in place liner to cured in place liner joint of a seventh embodiment.

FIG. 17 illustrates a seventh embodiment of a connecting joint 624 between adjacent cured in place liners 622 of the cured in place liner system 12. In this embodiment, the connecting joint 624 comprises couplers which are flange fittings 690 inserted inside the liner coupling sections 622A. A seal is formed between each flange fitting 690 and its respective liner 622. For example, bands (not shown) may be disposed and tightened about the outside surfaces of the liner coupling sections 622A to clamp the liners on the flange fittings. Alternatively or in addition, an adhesive may be applied to the inside of the liner coupling section 622A or outside of the flange fitting 690 to make a seal. Flanges 690A on the flange fittings 690 are constructed to be secured together (e.g., by bolts 692) to form a fluid tight seal between the flange fittings. Flange fittings such as the flange fittings 690 may also be used to form terminal connections.

Figure 18A:
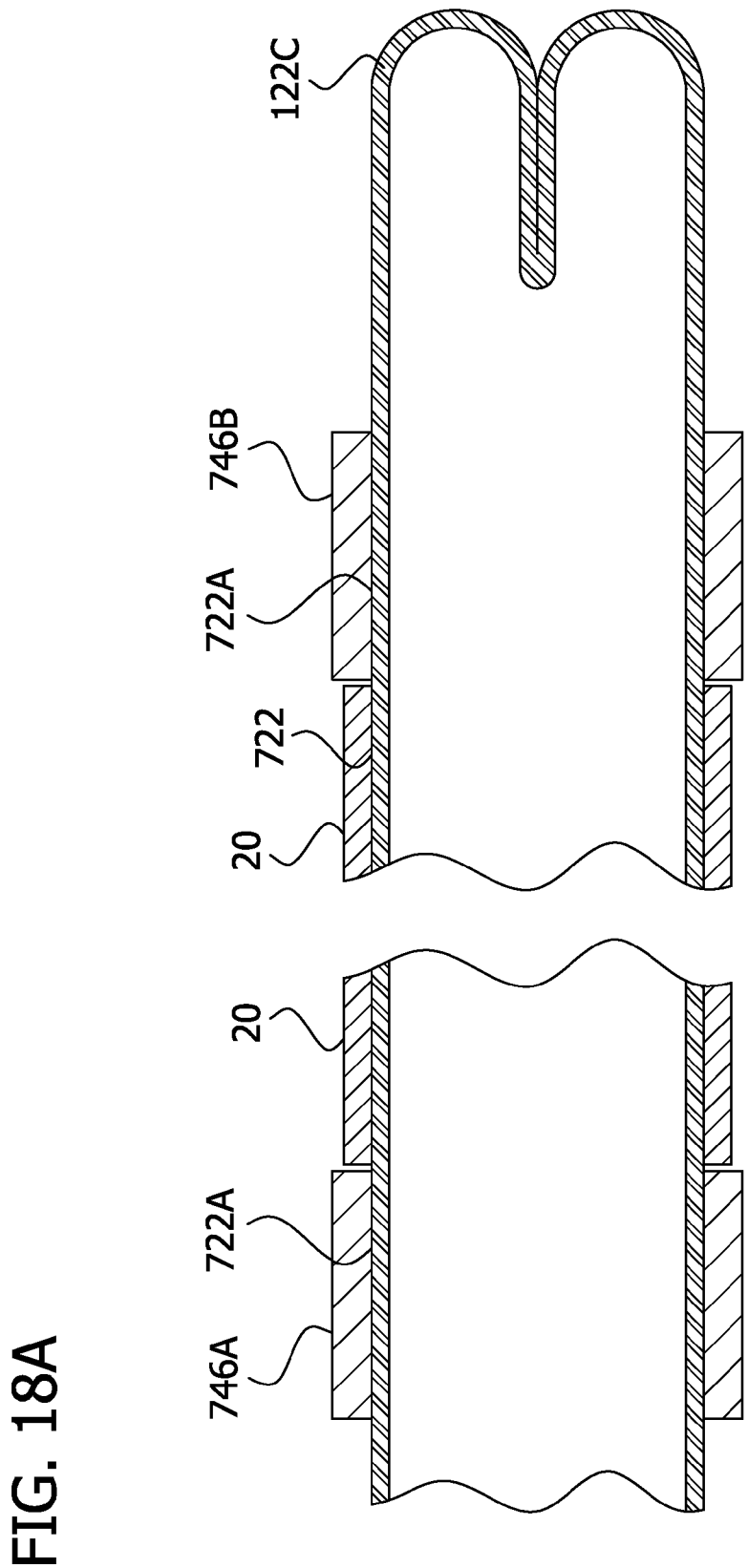
FIG. 18A-18B are fragmentary sections illustrating a sequence of forming a cured in place liner having connecting sections at opposite ends of the liner using two molds.
Figure 18B:
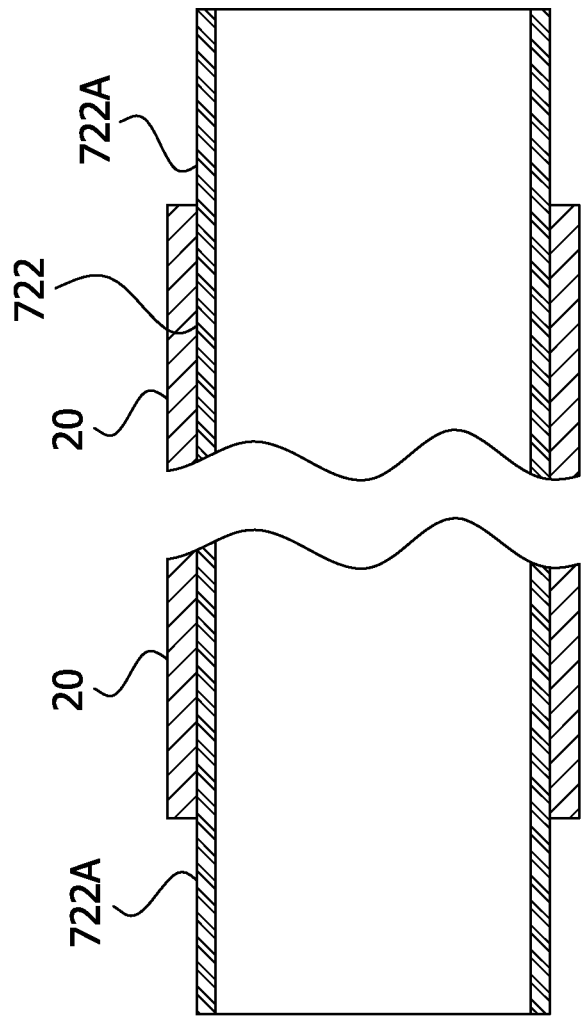

In some embodiments, a cured in place liner may be installed using two molds. FIGS. 18A-18B illustrate in sequence a method in which two molds 746A, 746B are used to install a liner 722. As shown in FIG. 18A, a first mold 746A is positioned at one end of the pipe 20, and a second mold 746B is positioned at an opposite end of the pipe. In use, the liner 722 is positioned in the pipe 20 so the connecting sections 722A of the liner extend out of the pipe into the molds 746A, 746B. The liner 722 may be installed by inserting it through the first mold 746A, through the pipe 20, and then into or through the second mold 746B. In the illustrated embodiment, the liner 722 is installed by eversion, but the liner may be inserted by pulling it into position without departing from the scope of the present invention. Fluid pressure in the liner 722 causes outer surfaces of the connecting sections 722A to conform to inner surfaces of the molds 746A, 746B. To complete the installation, the liner 722 is cured, the ends of the liner are cut to length, and the molds 746A, 746B are removed, as shown in FIG. 18B. The connecting sections 722A may then be connected to other liners or to another pipe of the previously installed pipe system.

The molds illustrated in FIG. 18 are similar to the mold 146 illustrated in FIGS. 7A-7D and are used to form liner connecting sections similar to the connecting section 122A shown in FIGS. 5, 6, and 7D. Other types of molds may be used in this same fashion, with one mold positioned at a first end of the pipe and another mold positioned at the opposite end of the pipe. For example, any of the molds 46, 146, 246 described above may be used at either end of the pipe 20 to form a respective liner connecting section such as illustrated in FIG. 4A-4D, 7A-7D, or 12A-12D.

The various connecting joints described above may be formed at preexisting connection points of the existing pipe system, or be formed at any point along the existing pipe system at which it may be desirable to cut the existing pipe system (e.g., at regular intervals corresponding approximately to lengths of cured in place liners to be installed). For example, the pipes 20 and 32 shown in FIG. 2, and the pipes 20 shown in FIG. 3, respectively, could have been part of the same pipe before a segment was removed and the cured in place liners and the couplers were installed.

The methods described above in which a mold is used may be carried out without the use of a mold. For example, the liner sleeve may be applied by hand about the end portion of the liner (before or after the liner is cured) without use of the mold. The mold serves to restrict the expansion of the liner and to cause the end portion of the liner to cure in a desirable state (e.g., circular) for facilitating formation of a continuous seal around the outside surface of the liner.

It is understood embodiments of intermediate connecting joints disclosed herein require no fluid communication with the previously installed ("existing") pipe system through which the cured in place pipe system is installed. The previously installed pipe system essentially serves as a form for shaping the cured in place pipe system. Once formed, the cured in place pipe system may stand alone with respect to the previously installed pipe system. For example, the intermediate connecting joints illustrated in FIGS. 1, 3, 6, 10, 11, 14, 15, and 17 require no connection or support from the previously installed pipe system. The couplers, bridge members, and other components which form the connections between the cured in place liners do not engage or contact pipes 20 of the previously installed pipe system. Moreover, the intermediate connecting joint components form a fluid-tight flow path across the joints themselves, without use of structure of pipes 20 of the previously installed pipeline system. In comparison, the intermediate connection illustrated in FIG. 16 uses a portion of the previously installed pipe system to form the connection. More specifically, the coupler 534 is partially mounted on the pipe. In the other disclosed embodiments of intermediate connections, for example, the couplers and other connection structure forming the intermediate connections are mounted solely on the cured in place liners.

In use, after a rehabilitation system of the type described herein has been installed, the fluid flow through the existing pipe system can be restored. The fluid flows from the upstream portion of the previously installed pipe system through the rehabilitation system to the downstream portion of the previously installed pipe system. The rehabilitation system defines a stand-alone fluid-tight flow path that is independent from the portion of the previously installed pipe system through which the rehabilitation system is installed.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for installing a liner impregnated with a curable resin in a previously installed host pipe, the method comprising:
   positioning a mold which is separate from the pipe at an end of the pipe;
   positioning the liner in the pipe so a connecting section of the liner extends into the mold;
   curing the liner whereby the mold causes the connecting section to cure in a predetermined desired configuration for forming a connection with the liner; and
   removing the mold from the liner.

2. A method as set forth in claim 1 wherein the mold causes the connecting section to cure in a configuration in which the connecting section has a generally circular outer profile.

3. A method as set forth in claim 2 wherein the mold causes the connecting section to cure in a configuration having an outer diameter about the same as an outer diameter of the pipe.

4. A method as set forth in claim 1 further comprising conforming the outer surface of the connecting section to an inner surface of the mold before curing the liner.

5. A method as set forth in claim 4 wherein conforming the outer surface of the connecting section to the inner surface of the mold includes expanding the connecting section so the connecting section has a larger internal diameter than a portion of the liner positioned in the pipe.

6. A method as set forth in claim 5 wherein the connecting section is expanded to have an outer diameter about the same as an outer diameter of the pipe.

7. A method as set forth in claim 5 further comprising positioning a reinforcing member in the connecting section.

8. A method as set forth in claim 1 further comprising positioning a reinforcing member in the connecting section.

9. A method as set forth in claim 1 further comprising positioning a resin impregnated liner sleeve on an outside surface of the connecting section and curing the sleeve on the connecting section to form part of the connecting section and to provide the connecting section with increased thickness.

10. A method as set forth in claim 9 wherein the sleeve provides the connecting section with an outer diameter about the same as an outer diameter of the pipe.

11. A method as set forth in claim 9 wherein the sleeve is positioned in the mold and then positioned on the connecting section by positioning the mold on the liner.

12. A method as set forth in claim 1 wherein the mold is a first mold and the connecting section is a first connecting section, the method further comprising positioning a second mold at an opposite end of the pipe from the first mold, positioning the liner in the pipe so a second connecting section of the liner extends into the second mold, curing the liner whereby the second mold causes the second connecting section of the liner to cure in a predetermined desired configuration for forming a connection with the liner, and removing the second mold.

13. A method as set forth in claim 1 further comprising connecting the connecting section in fluid tight communication with a another liner.

14. A method as set forth in claim 13 wherein connecting the connecting section with the other liner includes installing a first coupler on the connecting section, a second coupler on the other liner, and a bridge member coupling the couplers in fluid tight communication.

15. A method as set forth in claim 13 wherein connecting the connecting section with the other liner includes inserting a first flanged fitting in the connecting section, inserting a second flanged fitting in the other liner and securing flanges of the first and second flanged fittings together to form a fluid tight connection between the liner and the other liner.

16. A method as set forth in claim 1 further comprising connecting an end of the liner opposite the connecting section in fluid communication with a pipe which is part of the previously installed pipe system.

17. A method as set forth in claim 1 wherein the mold comprises an annular body defining an interior cavity and said step of positioning the mold comprises positioning the annular body at the end of the pipe such that the interior cavity is aligned with a lumen extending through the end of the pipe.

18. A method as set forth in claim 17 wherein said step of positioning the liner comprises positioning liner so the connecting section extends into the interior cavity of the annular body.

19. A method as set forth in claim 18 wherein said step of positioning the liner comprises positioning the liner so the connecting section engages a radially inwardly facing surface of the annular body that defines the interior cavity.

\* \* \* \* \*